United States Patent
Zander et al.

(10) Patent No.: US 10,360,052 B1
(45) Date of Patent: *Jul. 23, 2019

(54) AUTOMATIC GENERATION OF MODELS FROM DETECTED HARDWARE

(71) Applicant: The Mathworks, Inc., Natick, MA (US)

(72) Inventors: Justyna Zander, Framingham, MA (US); Zijad Galijasevic, Shrewsbury, MA (US); Pieter J. Mosterman, Framingham, MA (US); David Koh, Boston, MA (US)

(73) Assignee: The MathWorks, Inc., Natick, MA (US)

( * ) Notice: Subject to any disclaimer, the term of this patent is extended or adjusted under 35 U.S.C. 154(b) by 1187 days.

This patent is subject to a terminal disclaimer.

(21) Appl. No.: 14/611,773

(22) Filed: Feb. 2, 2015

Related U.S. Application Data

(63) Continuation-in-part of application No. 13/962,606, filed on Aug. 8, 2013.

(51) Int. Cl.
 *G06F 13/10* (2006.01)
 *G06F 9/455* (2018.01)

(52) U.S. Cl.
 CPC .................. *G06F 9/455* (2013.01)

(58) Field of Classification Search
 CPC .................................................. G06F 9/455
 USPC ......................................................... 703/20
 See application file for complete search history.

(56) References Cited

U.S. PATENT DOCUMENTS

| | | | |
|---|---|---|---|
| 4,441,151 A | 4/1984 | Hayashibe | |
| 6,028,593 A | 2/2000 | Rosenberg et al. | |
| 6,957,110 B2 | 10/2005 | Wewalaarachchi | |
| 7,203,554 B2 | 4/2007 | Fuller | |
| 7,464,373 B1 | 12/2008 | Yunt et al. | |
| 7,523,023 B1 | 4/2009 | Koh et al. | |
| 7,925,611 B1 | 4/2011 | Bromley et al. | |
| 8,014,892 B2 | 9/2011 | Glasser | |
| 8,175,734 B2 | 5/2012 | Fogel | |
| 8,954,187 B1 | 2/2015 | Mylet | |

(Continued)

OTHER PUBLICATIONS

Wikipedia, "Plug and play," http://en.wikipedia.org/wiki/Plug_and_play, Dec. 29, 2014, 6 pages.

(Continued)

*Primary Examiner* — Hugh M Jones
(74) *Attorney, Agent, or Firm* — Young Basile Hanlon & MacFarlane, P.C.

(57) ABSTRACT

A method may include establishing a connection with a physical device, by a device. The method may include receiving information identifying the physical device, by the device. The method may include determining physical device information based on receiving the information identifying the physical device, by the device. The physical device information may be a description of the physical device. The method may include generating a set of model elements based on the physical device information, by the device. The set of model elements may include program code associated with simulating a behavior associated with the physical device. The method may include associating the set of model elements with a device model corresponding to the physical device, by the device.

22 Claims, 16 Drawing Sheets

(56) References Cited

U.S. PATENT DOCUMENTS

| | | | |
|---|---|---|---|
| 8,954,195 | B2 | 2/2015 | Summer et al. |
| 9,117,039 | B1 | 8/2015 | Mosterman |
| 9,245,068 | B1 | 1/2016 | Mosterman |
| 9,607,113 | B1 | 3/2017 | Ciolfi |
| 2001/0037190 | A1 | 11/2001 | Jung |
| 2002/0010655 | A1 | 1/2002 | Kjallstrom |
| 2002/0080139 | A1 | 6/2002 | Koo et al. |
| 2003/0093768 | A1 | 5/2003 | Suzuki |
| 2004/0083451 | A1 | 4/2004 | Abowd et al. |
| 2005/0044372 | A1* | 2/2005 | Aull ................ G06F 21/35 713/176 |
| 2005/0105793 | A1 | 5/2005 | Sorek et al. |
| 2005/0256694 | A1 | 11/2005 | Taylor |
| 2005/0257195 | A1 | 11/2005 | Morrow et al. |
| 2005/0278162 | A1 | 12/2005 | Ciolfi et al. |
| 2006/0008151 | A1 | 1/2006 | Lin et al. |
| 2006/0038816 | A1 | 2/2006 | Guest et al. |
| 2006/0068910 | A1 | 3/2006 | Schmidt et al. |
| 2006/0150149 | A1 | 7/2006 | Chandhoke et al. |
| 2006/0167667 | A1 | 7/2006 | Maturana et al. |
| 2006/0199167 | A1 | 9/2006 | Yang et al. |
| 2008/0007568 | A1 | 1/2008 | Chou et al. |
| 2008/0013793 | A1 | 1/2008 | Hillis et al. |
| 2008/0037571 | A1 | 2/2008 | Hetzel et al. |
| 2008/0040703 | A1 | 2/2008 | Englehart |
| 2008/0062167 | A1 | 3/2008 | Boggs et al. |
| 2008/0098349 | A1 | 4/2008 | Lin et al. |
| 2008/0189638 | A1 | 8/2008 | Mody et al. |
| 2008/0249759 | A1 | 10/2008 | Trumble |
| 2009/0015663 | A1 | 1/2009 | Doettling |
| 2009/0036750 | A1 | 2/2009 | Weinstein et al. |
| 2009/0037013 | A1 | 2/2009 | Hendler |
| 2009/0058799 | A1 | 3/2009 | Huang et al. |
| 2009/0061404 | A1 | 3/2009 | Toly |
| 2009/0073034 | A1 | 3/2009 | Lin |
| 2009/0089031 | A1 | 4/2009 | Sturrock et al. |
| 2009/0157478 | A1 | 6/2009 | Yang et al. |
| 2009/0292514 | A1 | 11/2009 | McKim et al. |
| 2009/0315841 | A1 | 12/2009 | Cheng et al. |
| 2010/0009308 | A1 | 1/2010 | Wen et al. |
| 2010/0251255 | A1 | 9/2010 | Miyamoto et al. |
| 2011/0032255 | A1 | 2/2011 | Favier et al. |
| 2011/0040392 | A1 | 2/2011 | Hamann et al. |
| 2011/0060463 | A1 | 3/2011 | Selker et al. |
| 2011/0106339 | A1 | 5/2011 | Phillips et al. |
| 2011/0154243 | A1 | 6/2011 | Styga et al. |
| 2011/0205341 | A1 | 8/2011 | Wilson et al. |
| 2011/0261083 | A1 | 10/2011 | Wilson |
| 2012/0007891 | A1 | 1/2012 | Chiang |
| 2012/0095575 | A1 | 4/2012 | Meinherz et al. |
| 2012/0221124 | A1 | 8/2012 | Thiele |
| 2012/0239169 | A1 | 9/2012 | Smith et al. |
| 2012/0254830 | A1 | 10/2012 | Conrad et al. |
| 2012/0259469 | A1 | 10/2012 | Ward |
| 2012/0276993 | A1 | 11/2012 | Lerner et al. |
| 2012/0317501 | A1 | 12/2012 | Milou |
| 2012/0320080 | A1 | 12/2012 | Giese et al. |
| 2013/0090770 | A1 | 4/2013 | Lee |
| 2013/0177235 | A1 | 7/2013 | Meier |
| 2013/0332119 | A1 | 12/2013 | Santiquet et al. |
| 2014/0047417 | A1 | 2/2014 | Kaasila et al. |
| 2014/0108559 | A1 | 4/2014 | Grochowicz et al. |
| 2014/0122028 | A1 | 5/2014 | Aberg |
| 2014/0132594 | A1 | 5/2014 | Gharpure et al. |
| 2014/0157129 | A1 | 6/2014 | Dinshaw et al. |
| 2014/0163930 | A1 | 6/2014 | Balon et al. |
| 2014/0180644 | A1 | 6/2014 | Maturana et al. |
| 2014/0208272 | A1 | 7/2014 | Vats et al. |
| 2014/0241347 | A1* | 8/2014 | Yadav ................ H04L 45/56 370/389 |
| 2014/0247260 | A1 | 9/2014 | Ghoneima et al. |
| 2014/0317594 | A1 | 10/2014 | He et al. |
| 2014/0327670 | A1 | 11/2014 | Chen et al. |
| 2014/0365199 | A1 | 12/2014 | Mosterman et al. |
| 2015/0100179 | A1 | 4/2015 | Alaniz |

OTHER PUBLICATIONS

Wikipedia, "3D printing" http//en.wikipedia.org/wiki/3D_printing, May 25, 2012, 9 pages.

Nishino et al., "A virtual environment for modeling 3D objects through spatial interaction," IEEE International Conference on Systems, Man, and Cybernetics, IEEE SMC'99 Conference Proceedings, vol. 6, 1999, pp. 81-86.

LaViola et al., "3D Spatial Interaction: Applications for Art, Design, and Science," SIGGRAPH 2011 Course, 2011, 72 pages.

Izadi, Shahram, et al. "KinectFusion: real-time 3D reconstruction and interaction using a moving depth camera," Proceedings of the $24^{th}$ annual ACM symposium on User interface software and technology, ACM, 2011, pp. 559-568.

Piekarski et al. "Integrated head and hand tracking for indoor and outdoor augmented reality." Proceedings of IEEE Virtual Reality, 2004, 8 pages.

Co-pending U.S. Appl. No. 13/730,279 entitled "Interacting With a Model Via a Three-Dimensional (3D) Spatial Environment" filed Dec. 28, 2012, by Mosterman et al., 75 pages.

Lee, Yong-Gu, et al. "Immersive modeling system (IMMS) for personal electronic products using a muti-model interface." Computer-Aided Design 42.5 (2010): 387-401.

Ohshima, Toshikazu, et al. "A mixed reality system with visual and tangible interaction capability-application to evaluating automobile interior design." Proceedings of the $2^{nd}$ IEEE/ACM International Symposium on Mixed and Augmented Reality. IEEE Computer Society, 2003, 2 pages.

McKinney, Kathleen, et al. "Interactive 4D-CAD." Proceeding of the third Congress on Computing in Civil Engineering. ASCE, Anaheim, CA, Jun. 1996, 9 pages.

Kordon, Mark, et al. "Model-based engineering design pilots at jpl." IEEEAC paper 1678 (2007), 24 pages.

Wikipedia, "Hardware-in-the-loop simulation", https://en.wikipedia.org/w/index.php?title=Hardware-in-the-loopsimulation&oldid=565804435, Jul. 25, 2013, 5 pages.

* cited by examiner

AUTOMATIC GENERATION OF MODELS FROM DETECTED HARDWARE

REFERENCE TO RELATED APPLICATION

This continuation-in-part application claims priority to U.S. patent application Ser. No. 13/962,606, filed Aug. 8, 2013, the entire content of which is incorporated herein by reference.

BRIEF DESCRIPTION OF THE DRAWINGS

FIGS. 4A-4H are diagrams of an example implementation of automated generation of a model for a physical device;

DETAILED DESCRIPTION

The following detailed description of example implementations refers to the accompanying drawings. The same reference numbers in different drawings may identify the same or similar elements.

A model may include a set of model elements that, when executed on a computing device, simulates behavior of a system. The system may include a set of physical devices that correspond to portions of the system. The model elements may correspond to the physical devices and may, when executed, simulate the behavior of the physical devices and/or the system. Systems and/or methods, described herein, may enable a host device to automatically and/or manually determine a model element for a physical device. Once the model element is established for the physical device, the host device may simulate aspects of the physical device, control aspects of the physical device, and/or alter aspects of program code being executed by the physical device. Implementations, described herein, may facilitate creation of a model of a system.

Figure 1:
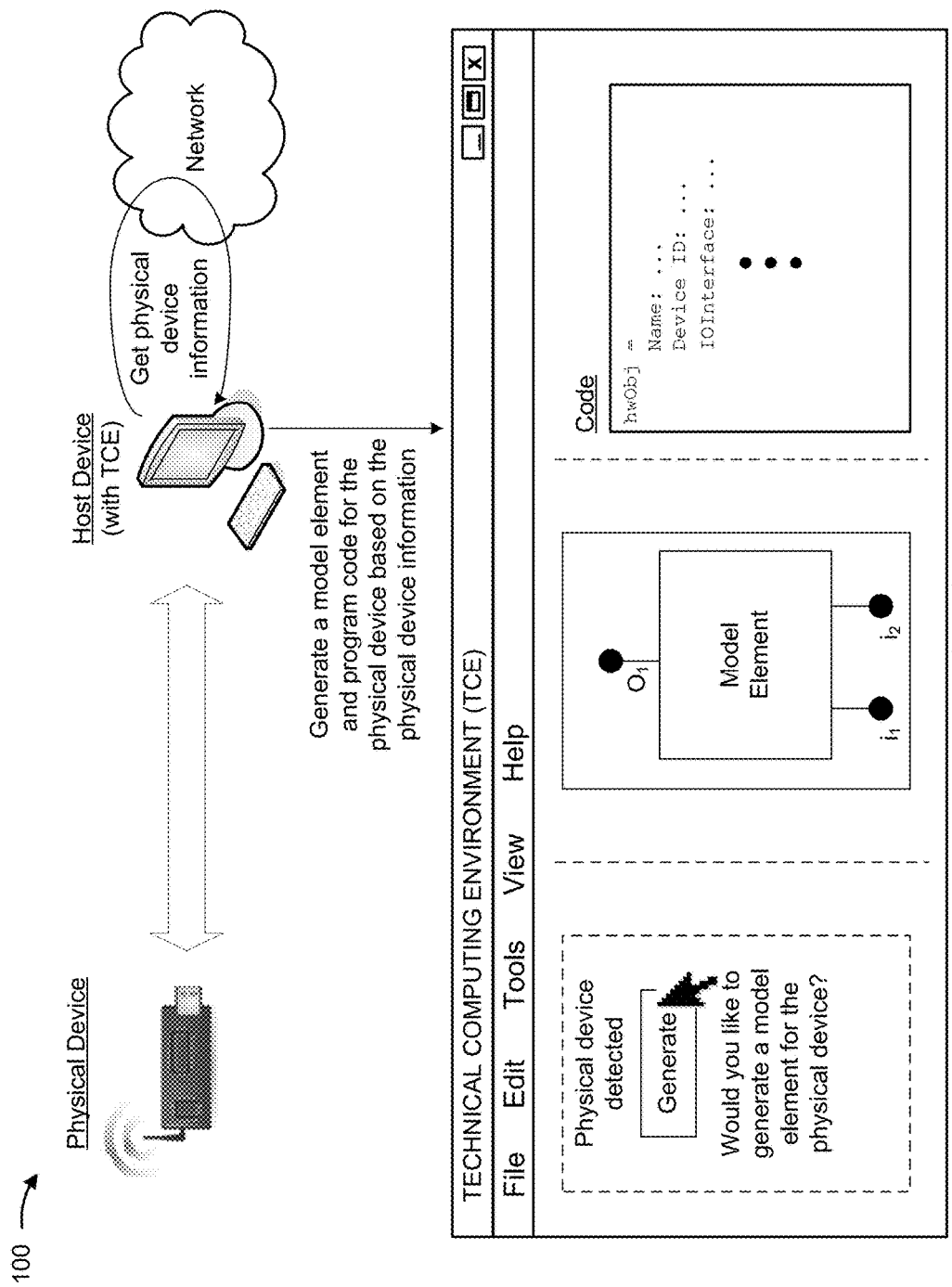
FIG. 1 is a diagram of an overview of an example implementation described herein.

FIG. 1 is a diagram of an overview of an example implementation 100 described herein. As shown in FIG. 1, example implementation 100 may include a physical device, such as a sensor, an actuator, a phone, a mobile device, a camera, or the like, and a host device including a technical computing environment (TCE). The host device may detect that the physical device has moved within communication range of the host device, and may establish a connection to communicate with the physical device. In some implementations, the host device may detect the physical device without the physical device moving within a particular spatial proximity. For example, the host device may detect the physical device via a local area network (LAN), at a particular internet protocol (IP) address via the Internet, or via another virtual connection. In some implementations, the host device may detect that the physical device has been connected to the host device via a wired connection, a wireless connection, or a combination of wired and wireless connections. In another example, the host device may generate a model element, as described herein, without detecting the physical device and/or without connecting to the physical device. For example, the host device may receive a user indication of a location for physical device information, and may generate the model element using the physical device information located based on the user indication.

As further shown in FIG. 1, the host device may provide an indication, in the TCE, that the physical device has been detected, and may receive a request to generate a model element corresponding to the physical device. For example, a user may provide input via a graphical user interface (GUI) of the TCE to indicate a decision to generate the model element for the physical device. The host device may, based on the user input, request that the physical device provide physical device identification information, such as a physical device information pointer to physical device information associated with generating the model element (e.g., a location identifier, such as a network address, or the like, information identifying the physical device, etc.), or the like. The host device may receive the physical device information pointer from the physical device, and may utilize the physical device information pointer to locate the physical device information. For example, the physical device may provide a location identifier, such as a network address, to the host device, and the host device may request and receive physical device information from a server associated with the network address. The physical device information may include, for example, information identifying a set of hardware elements associated with the physical device, information identifying a set of functionalities associated with the physical device, information identifying a set of schedulers associated with the physical device, information identifying a set of toolchains associated with the physical device, or the like. A hardware element may refer to an element of the physical device that performs a functionality and is associated with a behavior. For example, the physical device may include a motor hardware element that performs a movement functionality and is associated with speed, direction, and state behaviors. The physical device information may include declarative information, imperative information, dynamically typed information, array based information, model based information (e.g., a model), or the like.

As further shown in FIG. 1, the host device may determine whether a model element corresponding to the physical device, or a subsystem thereof, is stored in a repository (e.g., a cloud repository, a set of geographically distributed repositories, a set of virtual repositories, or the like). When the model element is stored in the repository, the host device may select the model element for incorporation into a model of the physical device. Additionally, or alternatively, when the model element is not stored in the repository, the host device may automatically and/or semi-automatically generate the model element based on the physical device information, and may incorporate the model element in the model and/or into the repository. The host device may automatically and/or semi-automatically generate program code associated with the model element based on generating the model element, and may provide information associated with the program code to the user. In this way, the host device may streamline creation of a model element for a physical device by leveraging existing model elements and/or generating new model elements, thereby improving the technical field of graphical programming and modeling.

In some implementations, the host device may utilize the TCE to generate and implement new program code, extended program code, limited program code, or the like for the physical device, and may provide the new program code to the physical device to add a new physical device functionality, change a physical device functionality, or the like. For example, when the physical device is a scanner, the host device may provide program code to the physical device associated with enabling a facial recognition functionality. In this way, the host device may facilitate modification of the physical device functionality.

In some implementations, the host device may control the physical device using the program code associated with the model element. For example, the host device may utilize one or more portions of program code to cause the physical device to utilize a physical device functionality, such as causing the physical device to move, causing the physical device to record sensor data, or the like. In this way, the host device may facilitate control of the physical device via the modeling environment framework.

In some implementations, the modeling environment framework may be virtualized in a public environment, a private environment, or a combination of public and private environments. For example, the model environment may be virtualized using a module, such as Hyper-V, Amazon Web Services (AWS), or the like. Additionally, or alternatively, the modeling environment framework may utilize model elements, parts of model elements, external computational elements (e.g., a computational element of the physical device, a computational element of another device, etc.), plug-ins (e.g., an Eclipse integrated development environment (IDE) plug-in, a .NET plug-in, etc.), other frameworks, other instances of the modeling environment framework, or the like.

In some implementations, the host device may simulate a behavior of the physical device using the program code associated with the model element. For example, the host device may use operational data via the program code associated with the model element to simulate a response by the physical device to corresponding operational data. In this way, the host device may, for example, facilitate testing of the physical device.

Figure 2:
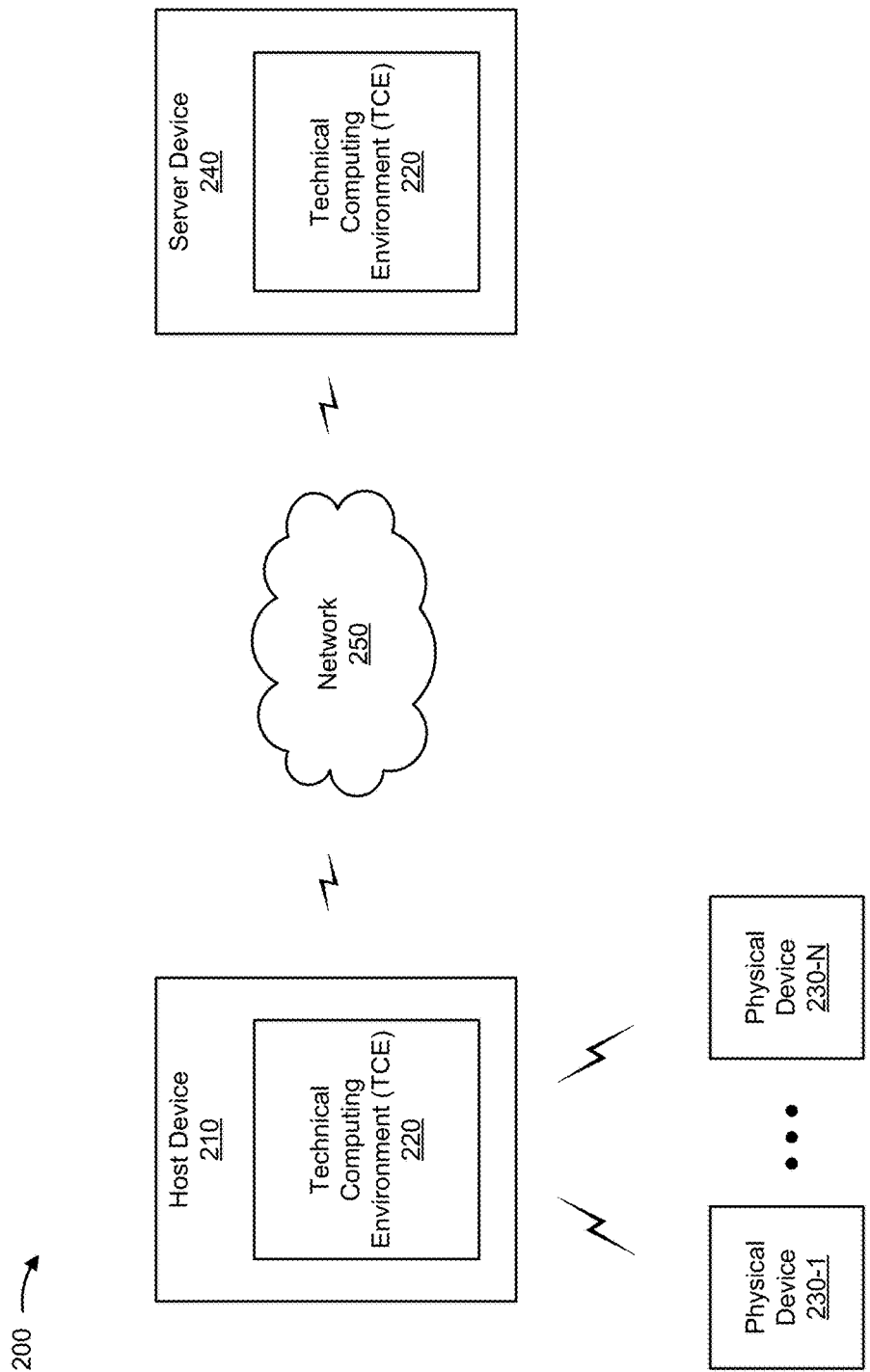
FIG. 2 is a diagram of an example environment in which systems and/or methods, described herein, may be implemented.

FIG. 2 is a diagram of an example environment 200 in which systems and/or methods, described herein, may be implemented. As shown in FIG. 2, environment 200 may include a host device 210, which may include a technical computing environment (TCE) 220. Furthermore, environment 200 may include a physical device 230-1 through 230-N (N>1) (hereinafter referred to collectively as "physical devices 230," and individually as "physical device 230"), a server device 240, which may include TCE 220, and a network 250. Devices of environment 200 may interconnect via wired connections, wireless connections, or a combination of wired and wireless connections.

Host device 210 may include one or more devices capable of receiving, generating, storing, processing, and/or providing a model and/or information associated with a model (e.g., a model element, a block, an input signal, a portion of program code, or the like). For example, host device 210 may include a computing device, such as a desktop computer, a laptop computer, a tablet computer, a mobile phone (e.g., a smart phone, a radiotelephone, or the like), or a similar device. In some implementations, host device 210 may receive information from and/or transmit information to physical device 230 and/or server device 240.

Host device 210 may host TCE 220. TCE 220 may include any hardware-based component or a combination of hardware and software-based components that provides a computing environment that allows tasks to be performed (e.g., by users) related to disciplines, such as, but not limited to, mathematics, science, engineering, medicine, and business. TCE 220 may be implemented as a text-based environment (e.g., MATLAB® software by The MathWorks, Inc.; Octave; Python; JavaScript; Comsol Script; MATRIXx from National Instruments; Mathematica from Wolfram Research, Inc.; Mathcad from Mathsoft Engineering & Education Inc.; Maple from Maplesoft; Extend from Imagine That Inc.; Scilab from The French Institution for Research in Computer Science and Control (INRIA); Virtuoso from Cadence; Modelica or Dymola from Dassault Systemes; etc.) and/or a graphically-based environment (e.g., Simulink® software, Stateflow® software, SimEvents® software, Simscape™ software, etc., by The MathWorks, Inc.; VisSim by Visual Solutions; LabView® by National Instruments; Dymola by Dassault Systemes; SoftWIRE by Measurement Computing; WiT by DALSA Coreco; VEE Pro or SystemVue by Agilent; Vision Program Manager from PPT Vision; Khoros from Khoral Research; Gedae by Gedae, Inc.; Scicos from (INRIA); Virtuoso from Cadence; Rational Rose from IBM; Rhapsody or Tau from Telelogic; Ptolemy from the University of California at Berkeley; aspects of a Unified Modeling Language (UML) or SysML environment; etc.). In some implementations, TCE 220 may include a hybrid environment that includes one or more of the above-referenced text-based environments and one or more of the above-referenced graphically-based environments. In some implementations, TCE 220 may include, for example, a user interface and/or may enable simulation and execution of hardware and/or software systems. In some implementations, TCE 220 may include a high-level architecture (HLA) that facilitates performing a simulation, such as performing a distributed simulation.

TCE 220 may be integrated with or operate in conjunction with a graphical modeling environment, which may provide graphical tools for constructing models of systems and/or processes. TCE 220 may include additional tools, such as tools designed to convert a model into an alternate representation, such as an alternate model format, code or a portion of code representing source computer code and/or compiled computer code, a hardware description (e.g., a specification of a digital circuit, a description of a circuit layout, etc.), or the like. TCE 220 may also include tools to convert a model into project files for use in an integrated development environment (IDE) such as Eclipse by Eclipse Foundation, IntelliJ IDEA by JetBrains or Visual Studio by Microsoft.

A model may include one or more model elements that simulate characteristics of physical devices, such as physical devices 230. A model element may correspond to physical device 230 and may implement, in the model, data specifications, processing functions, and/or input/output connections that are representative of physical device 230. The model element may be associated with a graphical representation thereof that may include a set of entities, such as a block, a set of blocks (e.g., block diagram blocks), ports, a system, a set of systems, a model reference, a set of models, or the like. In some implementations, the model element may include a textual representation, such as a code line, a code section, a function, a method, a textual program, a script, an object, a method of an object, another textual model, or the like. In some implementations, model elements may include relations (e.g., a connector line, a symbolic reference, or the like), attributes (e.g., a sample time, a data type, a dimension, a physics type, etc.) While some implementations are described herein with respect to a model element representing a physical device (e.g., physical device 230), the model element may represent physical device 230 and/or a component, subsystem, etc. associated with a graphical representation of physical device 230. In some implementations, multiple physical devices 230 may be associated with a particular model element. Additionally, or alternatively, multiple model elements may be associated with a single physical device 230. In some implementations, the model may hierarchically include a particular model element, and the particular model element may hierarchically include a set of other model elements.

A model generated with TCE 220 may include, for example, equations (e.g., algebraic equations, differential equations, difference equations, etc.), one or more action languages and/or action language associated therewith, assignments, constraints, computations, algorithms, functions, methods, communication protocols, process flows, etc. The model may be implemented as, for example, time-based block diagrams (e.g., via the Simulink® product, available from The MathWorks, Incorporated), discrete-event based diagrams (e.g., via the SimEvents® product, available from The MathWorks, Incorporated), dataflow diagrams, state transition diagram (e.g., via the Stateflow® product, available from The MathWorks, Incorporated), software diagrams, one or more textual array-based and/or dynamically typed languages (e.g., via the MATLAB® product, available from The MathWorks, Incorporated) and/or textual array-based and/or dynamically typed language associated therewith, noncausal block diagrams (e.g., via the Simscape™ product, available from The MathWorks, Incorporated), and/or another type of model. In some implementations, a model include a time-based aspect, and may, during simulation and based on a sample time of the model (e.g., a discrete sample time, a continuous sample time, a fixed in minor step sample time, an inherited sample time, a constant sample time, a variable sample time, a triggered sample time, an asynchronous sample time, etc.), produce an output and/or update an internal state of the model.

Physical device 230 may communicate with host device 210 and may include one or more physical devices capable of receiving, generating, storing, processing, and/or providing information describing and/or associated with physical device 230. For example, physical device 230 may include a system and/or subsystem, such as a computing device, a mobile phone, a smart phone, a camera, a camcorder, a microphone, a video display, a robot, an unmanned aerial vehicle (UAV), an automobile, or the like. Additionally, or alternatively, physical device 230 may include another system and/or subsystem, such as a sensor, an actuator, a motor, an accelerometer, a gyroscope, a measurement device, an input component, an output component, a processing component, a video processor, a transmitter, or the like. In some implementations, physical device 230 may provide a physical device information pointer (e.g., information identifying an address, such as a network address, a port address, an Internet protocol (IP) address, or the like) for physical device information associated with physical device 230. In some implementations, physical device 230 may include one or more other physical devices 230. In some implementations, physical device 230 may utilize an interface, such as an application programming interface, to facilitate communication with other physical devices 230, to establish an ad hoc device network (e.g., which may be represented by a set of model elements) with other physical devices 230, or the like. In this case, physical device 230 may include a set of criteria associated with identifying and/or adding other physical devices 230 to the ad hoc device network. Physical device 230 may communicate with host device 210 using wired and/or wireless connections to exchange physical device information, information associated with TCE 220, information associated with host device 210, or the like. Physical device 230 may be modeled using TCE 220.

Server device 240 may include one or more devices capable of receiving, generating, storing, processing, and/or providing a model and/or information associated with a model (e.g., information associated with a model element). For example, server device 240 may include a computing device, such as a server, a desktop computer, a laptop computer, a tablet computer, or a similar device. In some implementations, server device 240 may host TCE 220. In some implementations, host device 210 may be used to access one or more TCEs 220 running on one or more server devices 240. For example, multiple server devices 240 may be used to execute program code (e.g., serially or in parallel), and may provide respective results of executing the program code to host device 210. In some implementations, server device 240 may include multiple TCEs 220, such as via a set of virtual machines or operating system processes.

In some implementations, host device 210 and server device 240 may be owned by different entities. For example, an end user may own host device 210, and a third party may own server device 240. In some implementations, server device 240 may include a device operating in a cloud computing environment. In this way, front-end applications (e.g., a user interface) may be separated from back-end applications (e.g., program code execution).

Network 250 may include one or more wired and/or wireless networks. For example, network 250 may include a cellular network, a public land mobile network (PLMN), a local area network (LAN), a wide area network (WAN), a metropolitan area network (MAN), a telephone network (e.g., the Public Switched Telephone Network (PSTN)), an ad hoc network, an intranet, the Internet, a fiber optic-based network, a private network, a cloud computing network, and/or a combination of these or other types of networks. In some implementations, network 250 may include one or more heterogeneous networks, such as a set of networks including an open-public network, a private network, or the like.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of environment 200 may perform one or more functions described as being performed by another set of devices of environment 200.

Figure 3:
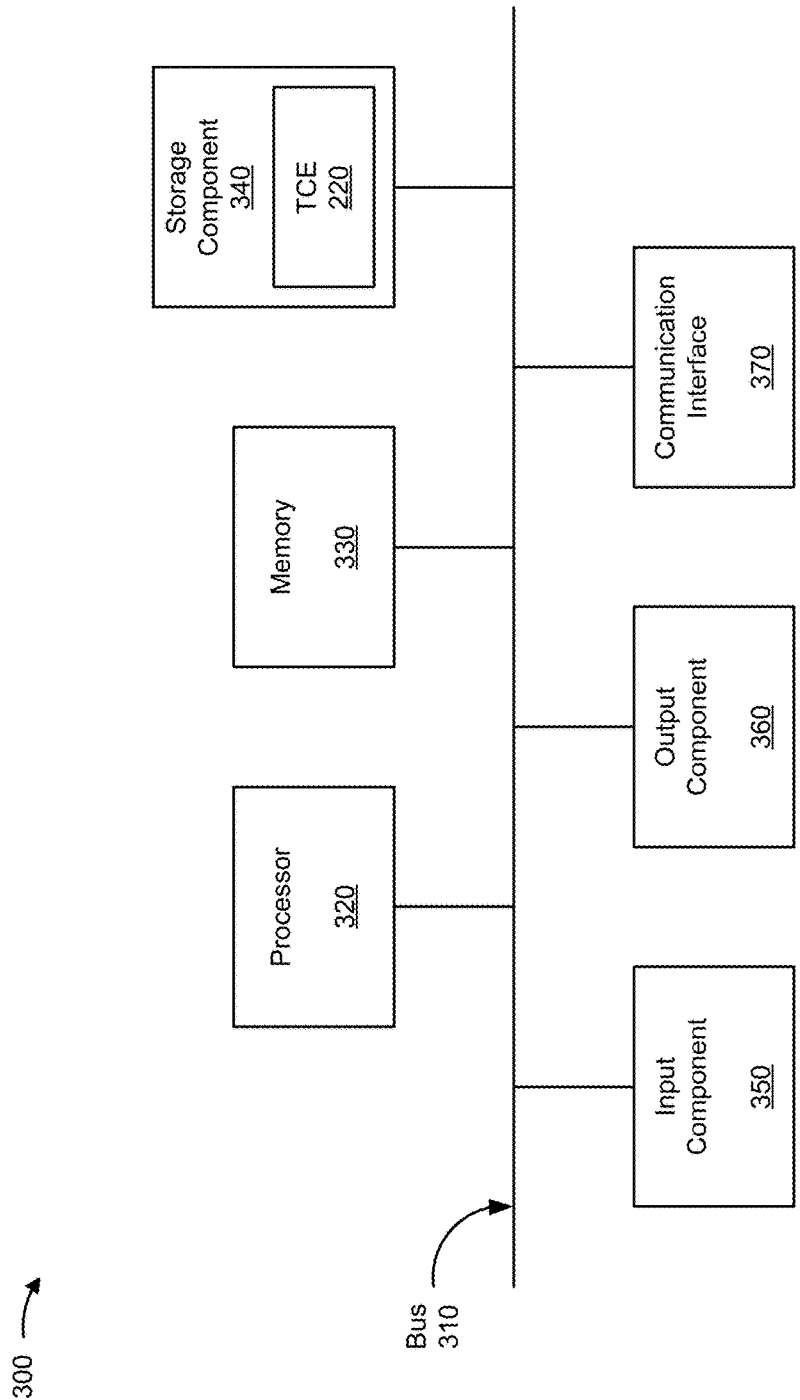
FIG. 3 is a diagram of example components of one or more devices of FIG. 2.

FIG. 3 is a diagram of example components of a device 300. Device 300 may correspond to host device 210, physical device 230, and/or server device 240. In some implementations, host device 210, physical device 230, and/or server device 240 may include one or more devices 300 and/or one or more components of device 300. As shown in FIG. 3, device 300 may include a bus 310, a processor 320, a memory 330, a storage component 340, an input component 350, an output component 360, and a communication interface 370.

Bus 310 may include a component that permits communication among the components of device 300. Processor 320 may include a processor (e.g., a central processing unit (CPU), a graphics processing unit (GPU), an accelerated processing unit (APU), etc.), a microprocessor, and/or any processing component (e.g., a field-programmable gate array (FPGA), an application-specific integrated circuit (ASIC), a homogenous multi-processor, a heterogeneous multi-processor, etc.) that interprets and/or executes instructions, and/or that is designed to implement one or more computing tasks. In some implementations, processor 320 may include multiple processor cores for parallel computing (e.g., a heterogeneous multi-core processor, a homogenous multi-core processor, or the like). Memory 330 may include a random access memory (RAM), a read only memory (ROM), and/or another type of dynamic or static storage device (e.g., a flash memory, a magnetic memory, an optical memory, etc.) that stores information and/or instructions for use by processor 320.

Storage component 340 may store information and/or software related to the operation and use of device 300. For example, storage component 340 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive. In some implementations, storage component 340 may store TCE 220.

Input component 350 may include a component that permits device 300 to receive information, such as via user input (e.g., a touch screen display, a keyboard, a keypad, a mouse, a button, a switch, a microphone, etc.). Additionally, or alternatively, input component 350 may include a sensor for sensing information (e.g., a global positioning system (GPS) component, an accelerometer, a gyroscope, an actuator, etc.). Output component 360 may include a component that provides output information from device 300 (e.g., a display, a speaker, one or more light-emitting diodes (LEDs), etc.).

Communication interface 370 may include a transceiver-like component (e.g., a transceiver, a separate receiver and transmitter, etc.) that enables device 300 to communicate with other devices, such as via a wired connection, a wireless connection, or a combination of wired and wireless connections. Communication interface 370 may permit device 300 to receive information from another device and/or provide information to another device. For example, communication interface 370 may include an Ethernet interface, an optical interface, a coaxial interface, an infrared interface, a radio frequency (RF) interface, a universal serial bus (USB) interface, a Wi-Fi interface, a cellular network interface, or the like.

Device 300 may perform one or more processes described herein. Device 300 may perform these processes in response to processor 320 executing software instructions stored by a computer-readable medium, such as memory 330 and/or storage component 340. A computer-readable medium is defined herein as a non-transitory memory device. A memory device includes memory space within a single physical storage device or memory space spread across multiple physical storage devices.

Software instructions may be read into memory 330 and/or storage component 340 from another computer-readable medium or from another device via communication interface 370. When executed, software instructions stored in memory 330 and/or storage component 340 may cause processor 320 to perform one or more processes described herein. Additionally, or alternatively, hardwired circuitry may be used in place of or in combination with software instructions to perform one or more processes described herein. Thus, implementations described herein are not limited to any specific combination of hardware circuitry and software.

The number and arrangement of components shown in FIG. 3 are provided as an example. In practice, device 300 may include additional components, fewer components, different components, or differently arranged components than those shown in FIG. 3. Additionally, or alternatively, a set of components (e.g., one or more components) of device 300 may perform one or more functions described as being performed by another set of components of device 300.

FIGS. 4A-4H are diagrams of an example implementation 400 of automated generation of a model for a physical device.

Figure 4A:
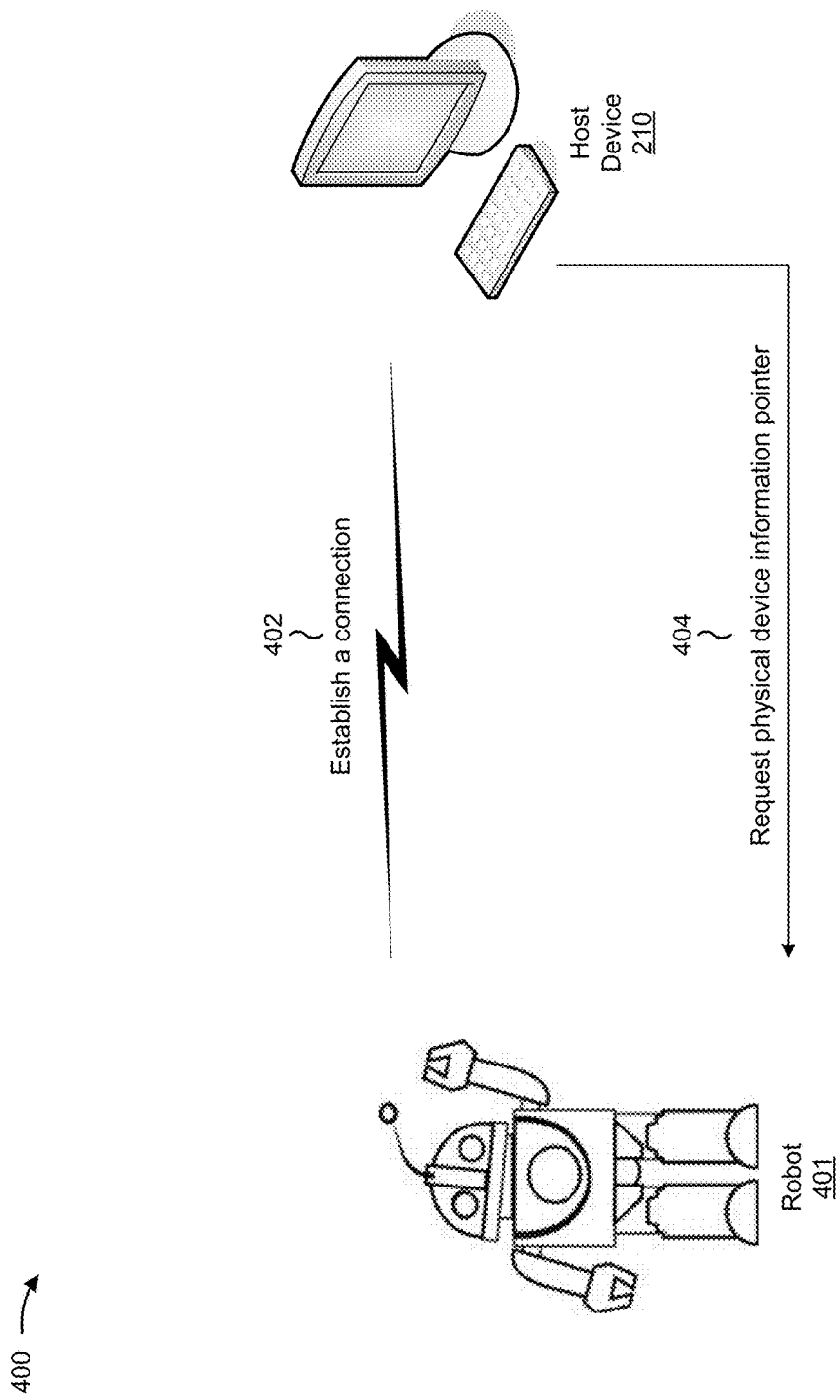

As shown in FIG. 4A, assume robot 401 (e.g., a particular physical device 230) is moved into range of host device 210. As shown by reference number 402, host device 210 establishes a connection with robot 401. In an implementation, described herein, robot 401 is unknown physical device 230 to host device 210 (i.e., host device 210 determines that a data structure storing model elements corresponding to physical devices 230 does not include model elements corresponding to robot 401). As shown by reference number 404, host device 210 transmits a request for a physical device information pointer to robot 401.

Figure 4B:
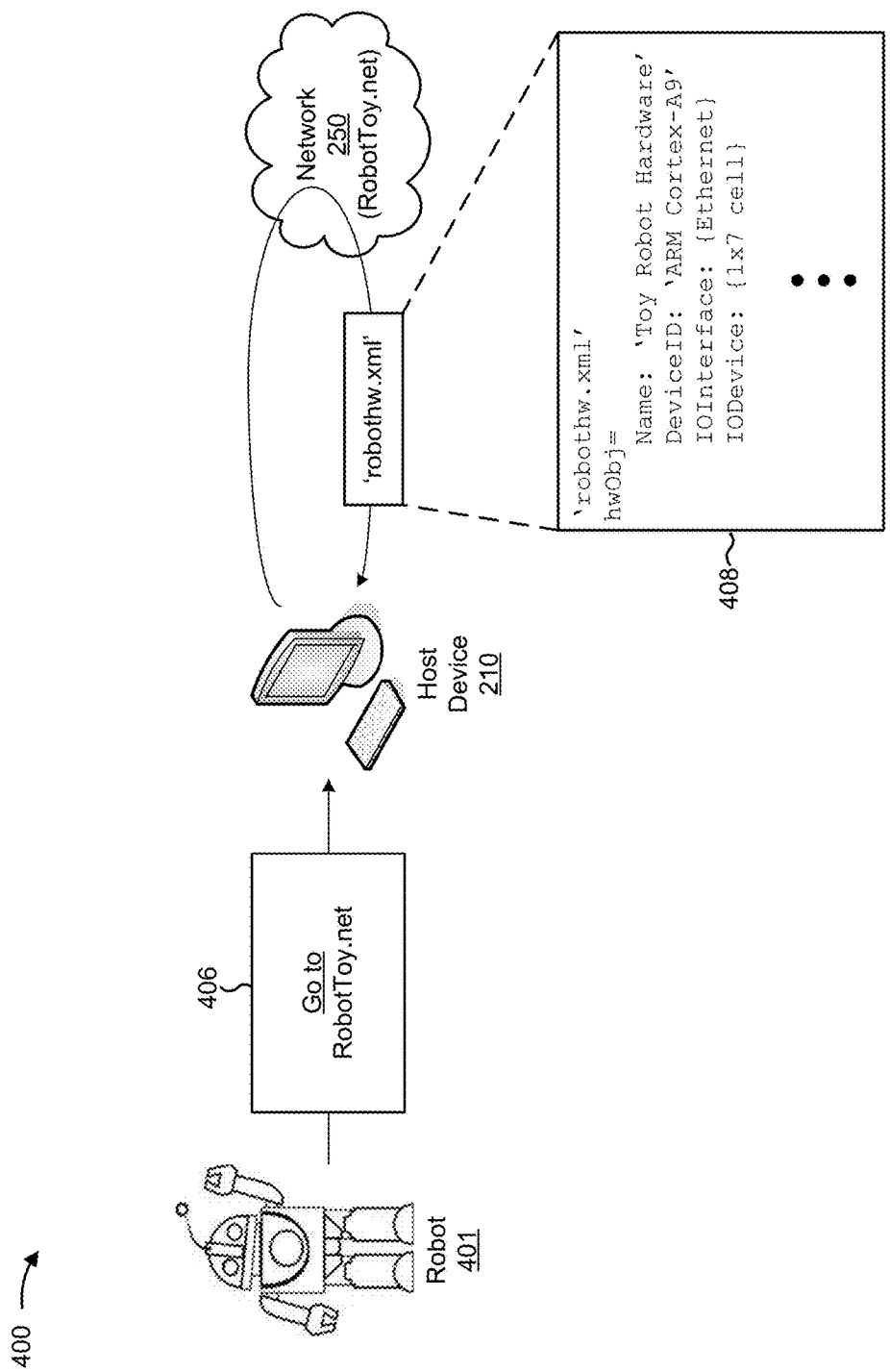

As shown in FIG. 4B, and by reference number 406, robot 401 provides the physical device information pointer to host device 210 (e.g., information identifying a network address associated with a vendor of robot 401). As shown by reference number 408, host device 210 receives physical device information associated with robot 401 (e.g., an extensible markup language (XML) document that includes a registration file, a hardware description, an input/output (I/O) module description, connection information, support software information, or the like for robot 401 and has been, in this implementation, partially translated to a MATLAB object).

Figure 4C:
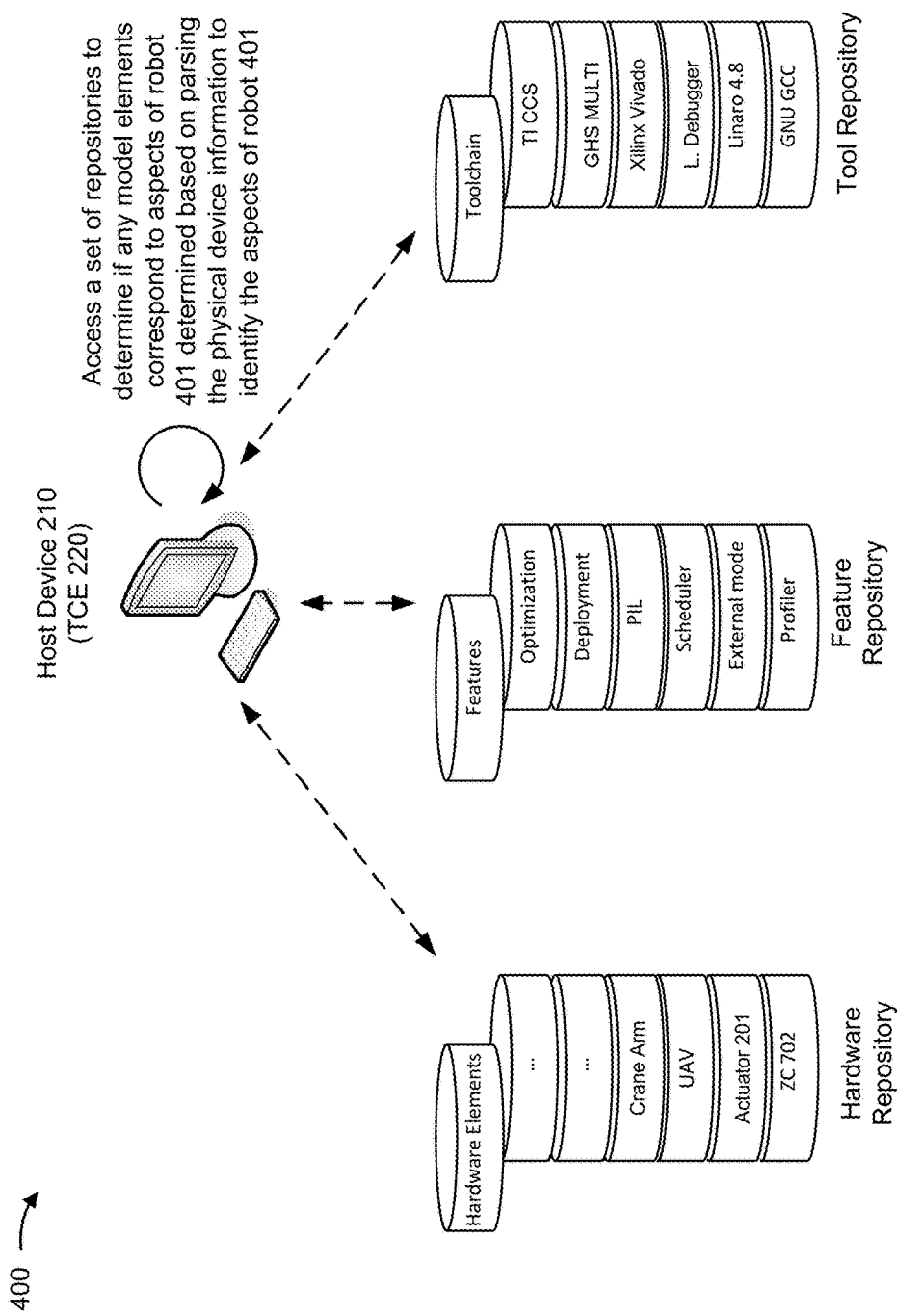
Figure 5A:
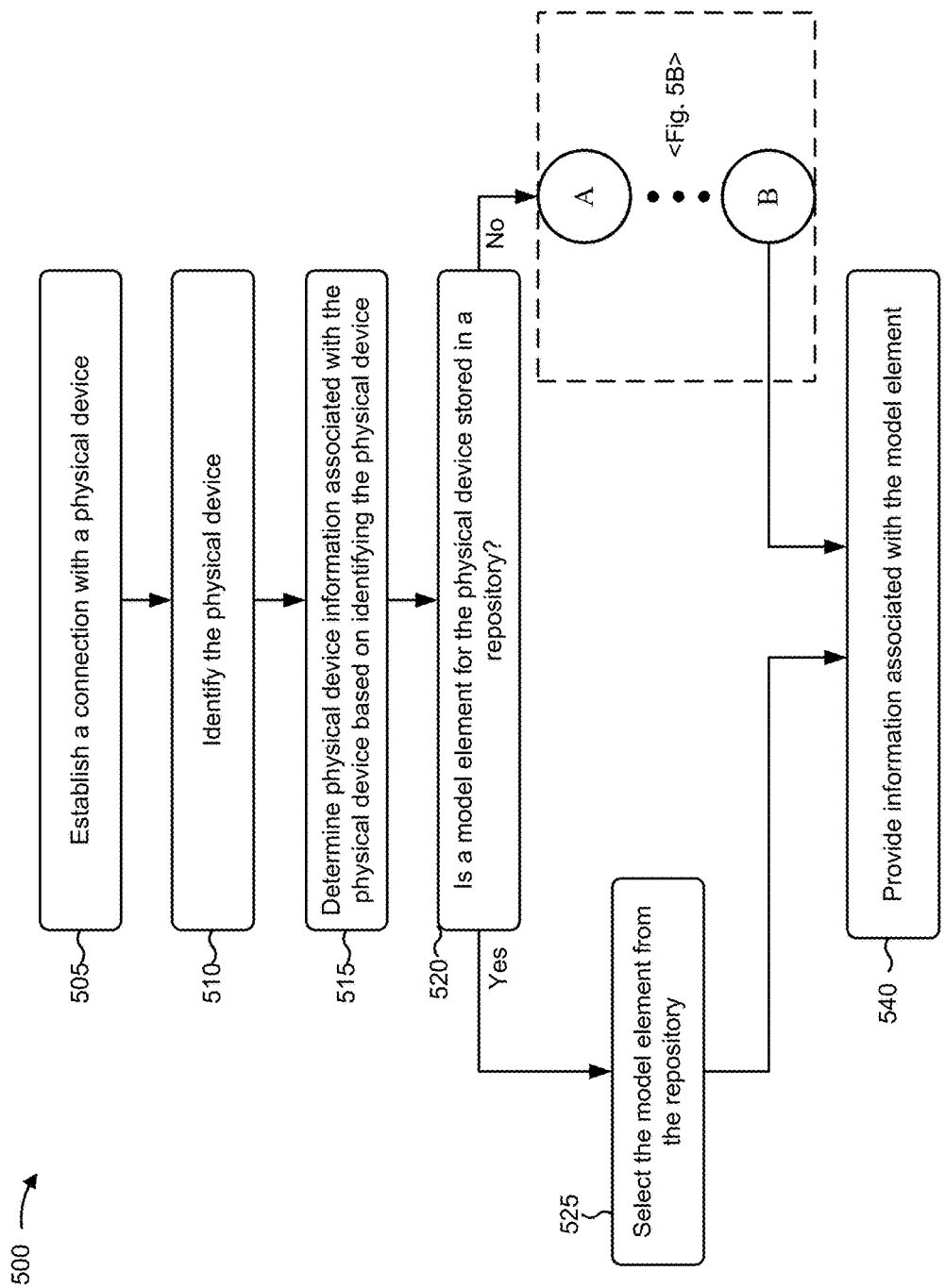
FIGS. 5A and 5B are a flow chart of an example process for automated generation of a model for a physical device.
Figure 5B:
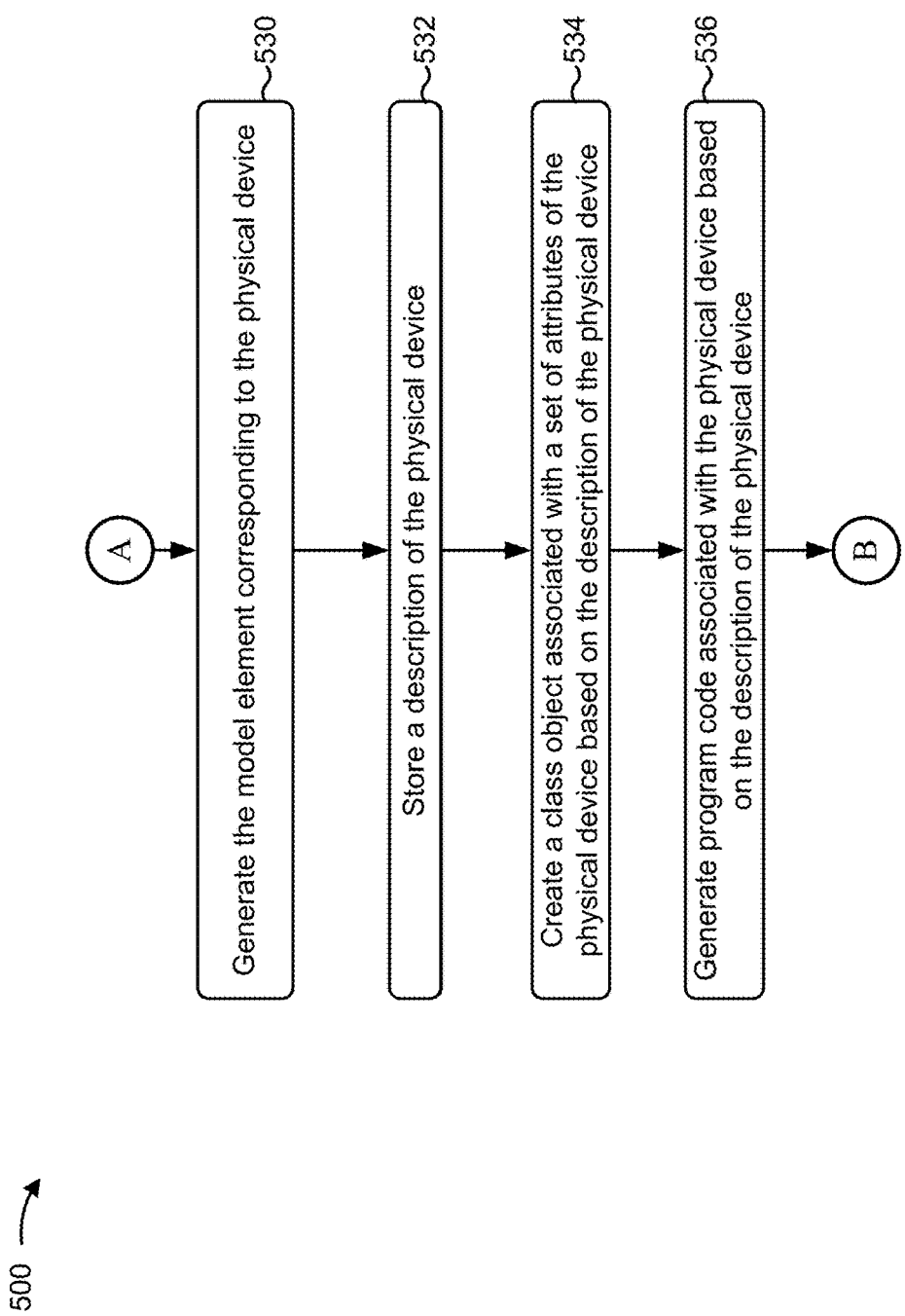

As shown in FIG. 4C, host device 210 parses the physical device information to identify aspects of robot 401, such as a hardware element, a functionality, or the like, and host device 210 accesses a set of data structures (e.g., a hardware repository data structure, a feature repository data structure, and a toolchain repository data structure as described herein with regard to FIGS. 5A and 5B) to determine whether any model elements (e.g., stored via the set of repositories) correspond to aspects of robot 401. For example, host device 210 may determine that robot 401 utilizes program code that may be compiled using GNU compiler collection (GCC) software, and may access information associated with the GCC software for incorporation into the model for robot 401.

Figure 4D:
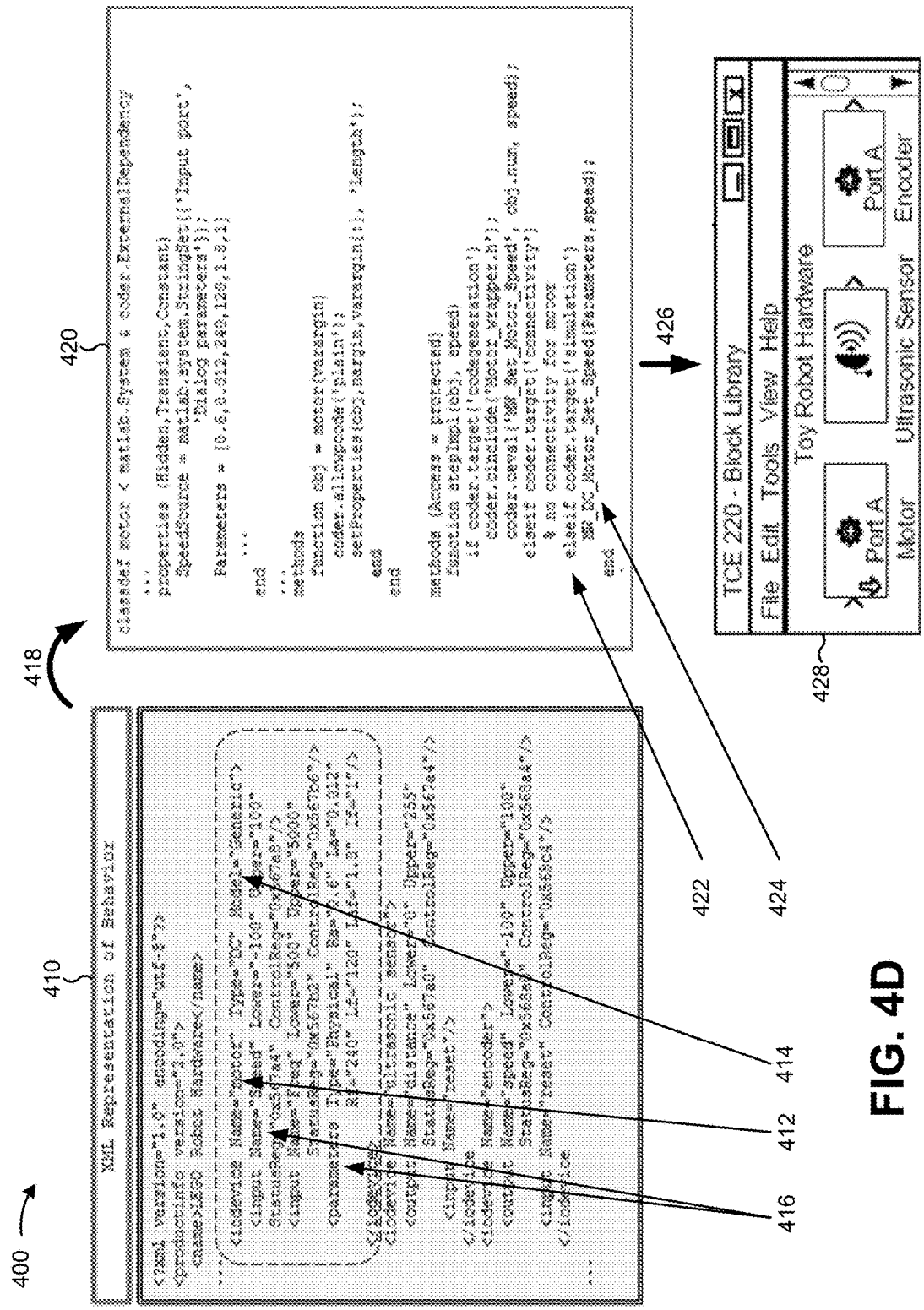

As shown in FIG. 4D, host device 210 may access XML representation 410 (e.g., an XML representation included in the physical device information identifying a set of functionalities, a set of behaviors, etc.) of a hardware element of robot 401. As shown by reference number 412, host device 210 may identify a motor as a hardware element of robot 401 that provides a movement functionality for robot 401. As shown by reference number 414, host device 210 identifies a model of the motor. As shown by reference number 416, host device 210 identifies a set of parameters and attributes associated with the motor. For example, XML representation 410 indicates that the motor is associated with a speed attribute that has an upper speed parameter (e.g., a maximum speed) and a lower speed parameter (e.g., a minimum speed). When simulating behavior of the motor, host device 210 may utilize a model element with a behavior class object corresponding to the motor that includes the speed attribute with the upper speed parameter and the lower speed parameter to ensure that the model element accurately models operation of robot 401. In this way, host device 210 may identify information that may be utilized to simulate the motor, control the motor, and/or modify a functionality of the motor. As shown by reference number 418, host device 210 may generate a behavior class object 420 (e.g., a "motor" class object) and generate program code associated therewith for simulating the motor. For example, as shown by reference number 422, host device 210 may generate program code to test a parameter associated with determining whether the model element is to perform simulation of the motor of robot 401. As shown by reference number 424, host device 210 may generate program code associated with visualizing simulation results of simulating the motor. As shown by reference number 426, host device 210 may register the motor via block library 428 with other elements of robot 401.

Figure 4E:
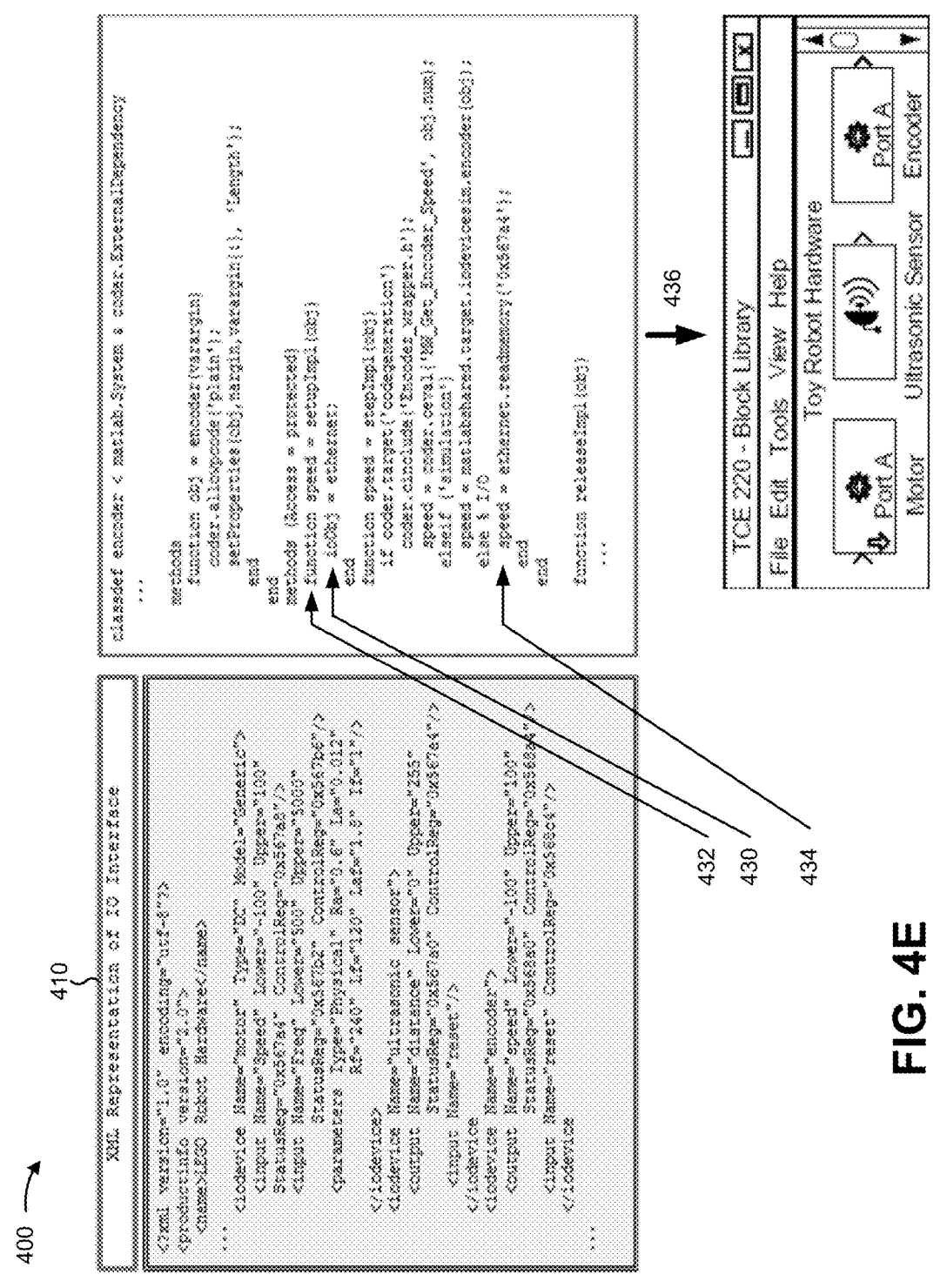

As shown in FIG. 4E, and by reference number 430, based on XML representation 410, host device 210 may generate an I/O class object (e.g., an Ethernet class object associated with an Ethernet interface) and program code associated therewith to facilitate communication with and/or control of robot 401 during simulation. In another example, the I/O class object may relate to a serial interface, a USB interface, a Joint Test Action Group IEEE 1149.1 Standard Test Access Port and Boundary-Scan Architecture interface, an Inter-Integrated Circuit interface, or the like. As shown by reference number 432, host device 210 may generate program code for the Ethernet I/O class object supported by robot 401. As shown by reference number 434, host device 210 may generate program code for reading memory associated with robot 401 and assigning the read-result to an output associated with the Ethernet interface. As shown by reference number 436, host device 210 may store the program code associated with communicating and/or controlling robot 401 (e.g., in a library of a design environment). In another example, host device 210 may generate program code associated with other functionalities of an I/O interface for which an I/O class object may be generated, such as a processor-in-the-loop functionality (e.g., a connectivity to TCE 220 during simulation), a real-time verification functionality (e.g., an external mode functionality), a tuning of robot 401 parameters functionality (e.g., a tuning performed by host device 210 during simulation), a monitoring of robot 401 signals and/or parameters functionality, a logging of information regarding robot 401 functionality, or the like.

Figure 4F:
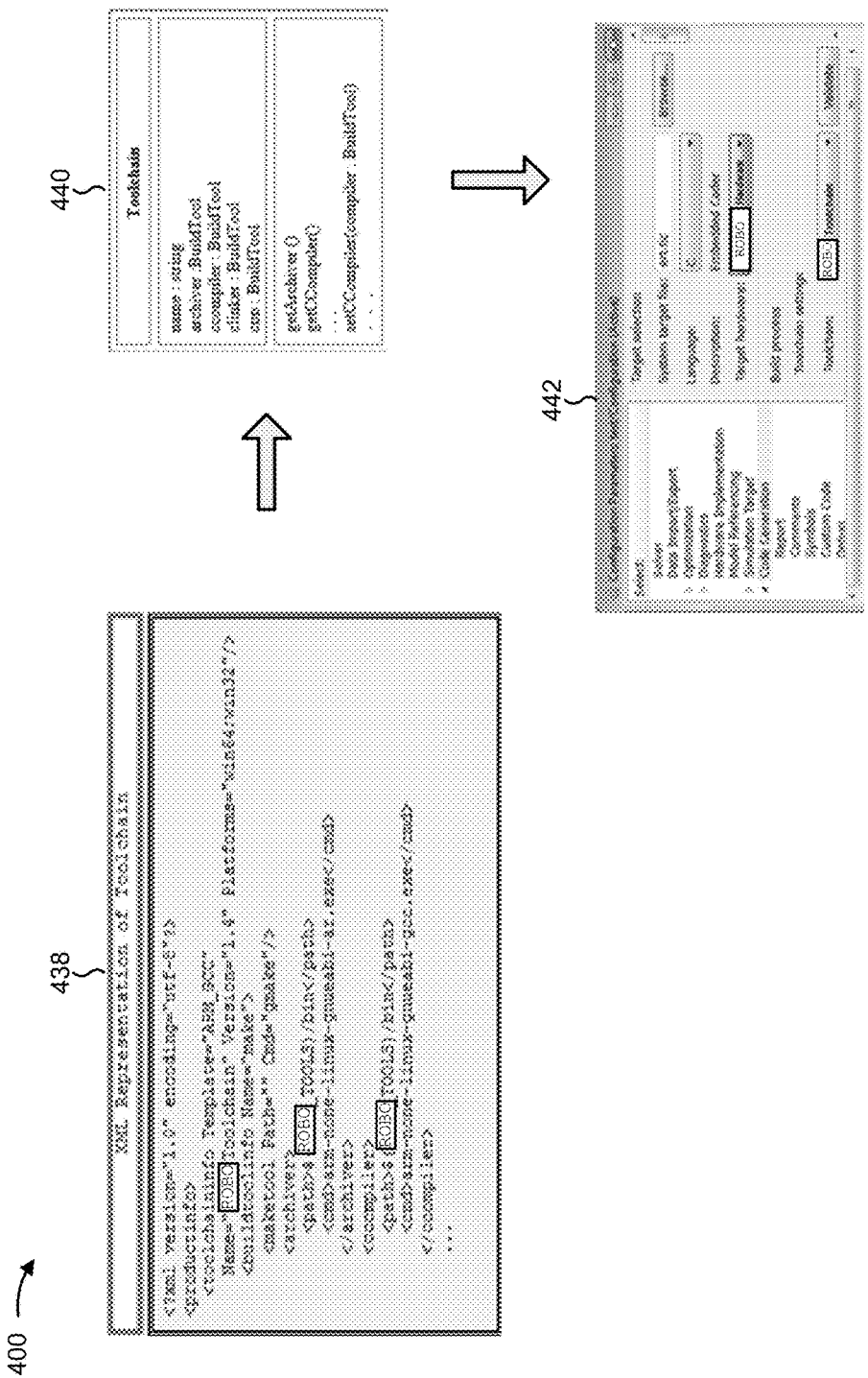

As shown in FIG. 4F, and by reference number 438, the physical device information may include an XML representation of a toolchain for use in generating program code for robot 401 (e.g., program code associated with altering a functionality associated with robot 401). For example, host device 210 may determine, based on the XML representation that the toolchain includes a particular archiver and a particular compiler. As shown by reference number 440, host device 210 may process XML representation 438 to generate a toolchain class object with a set of attributes, such as the particular archiver and the particular compiler. As shown by reference number 442, host device 210 registers the toolchain with target hardware robot 401 and adds the toolchain to a library storing available toolchains. In this way, the toolchain may be re-used for similar robots 401 and/or other physical devices 230 that are compatible with the toolchain.

Figure 4G:
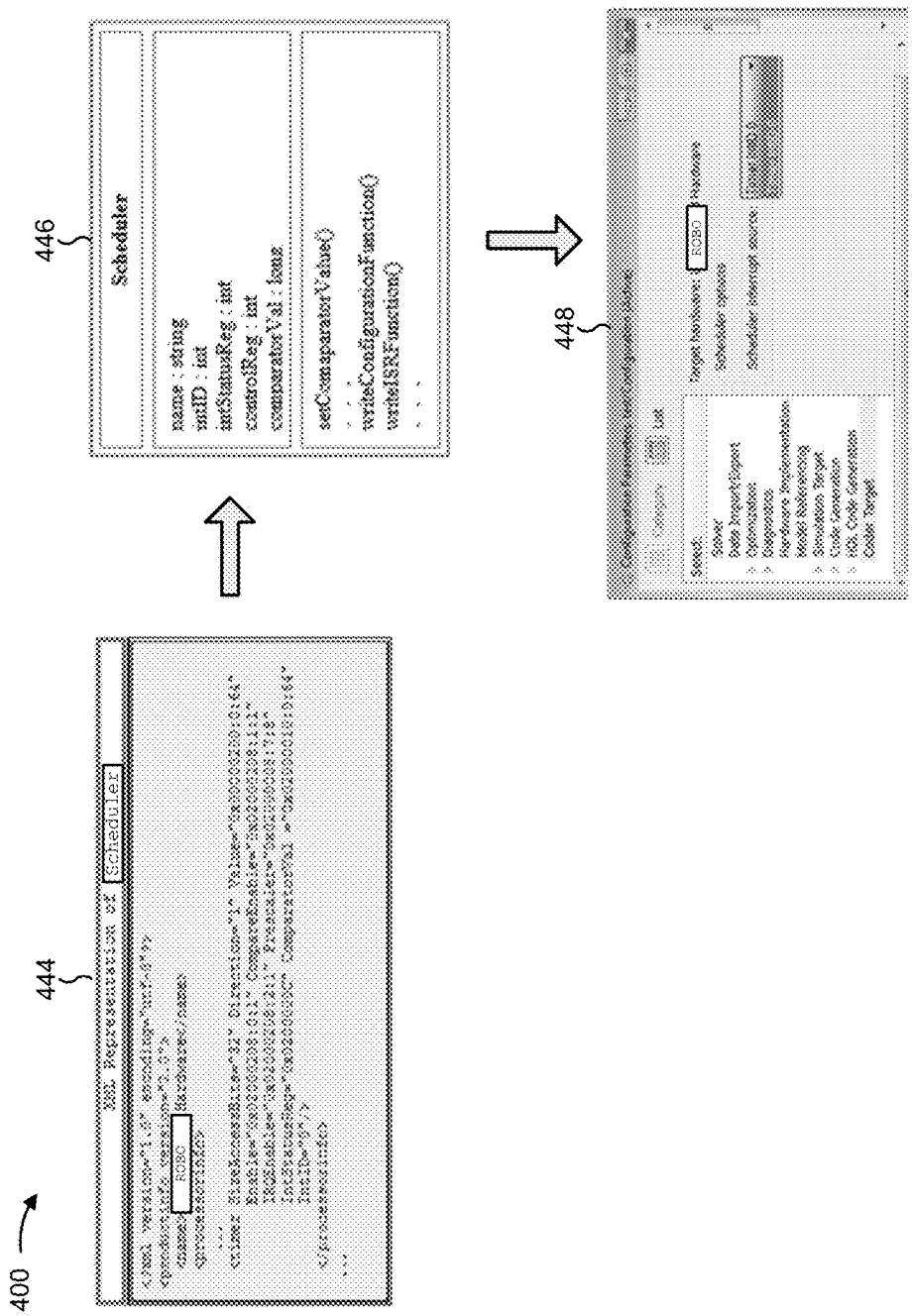

As shown in FIG. 4G, and by reference number 444, the physical device information may include an XML representation of a scheduler for use in generating program code for robot 401 (e.g., program code associated with altering a functionality associated with robot 401). As shown by reference number 446, host device 210 may process XML representation 444 to generate a scheduler class object with a set of attributes determined based on XML representation 444. As shown by reference number 448, host device 210 registers the scheduler with target hardware robot 401 and adds the scheduler to a library storing available schedulers. In this way, the scheduler may be re-used for similar robots 401 and/or other physical devices 230 that are compatible with the scheduler.

Figure 4H:
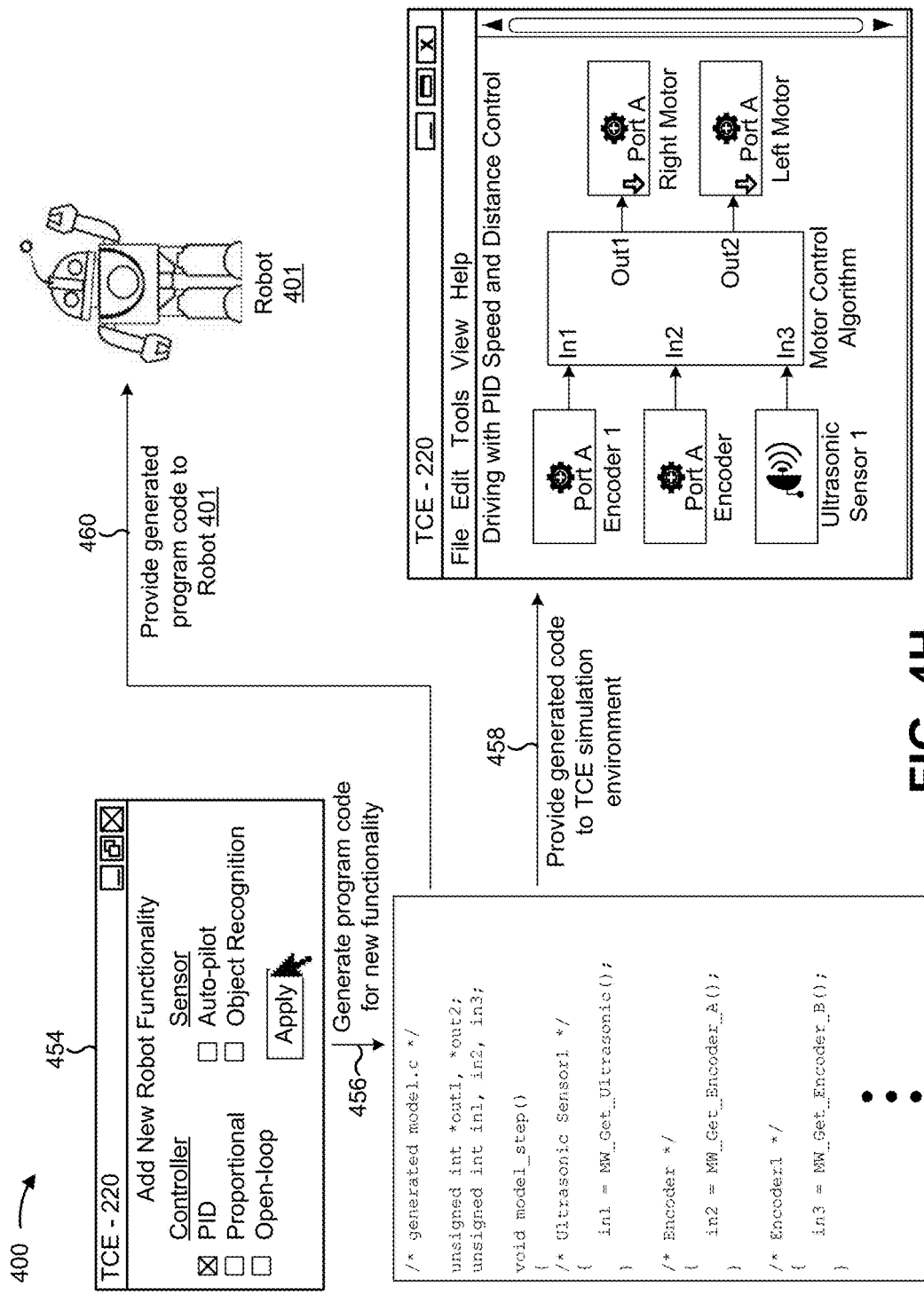

As shown in FIG. 4H, in an implementation host device 210 provides a user interface for TCE 220, and includes a set of options for simulating new software modules that may be added to the model for robot 401. As shown by reference number 454, a user may select an option to apply a particular new physical device functionality (e.g., a proportional-integral-differential (PID) controller) to the model for robot 401. As shown by reference number 456, host device 210 generates program code for the PID controller. As shown by reference number 458, host device 210 provides the generated program code for display and/or simulation via TCE 220. Assume that the user instructs host device 210 to update robot 401 to include the PID controller based on simulating the PID controller via TCE 220. As shown by reference number 460, host device 210 provides the generated program code associated with the PID controller to robot 401. In this way, host device 210 may facilitate a user testing a new physical device functionality using a simulation environment provided via TCE 220, and may provide program code associated with the new physical device functionality to physical device 230 to modify behavior of physical device 230.

As indicated above, FIGS. 4A-4H are provided merely as an example. Other examples are possible and may differ from what was described with regard to FIGS. 4A-4H.

FIGS. 5A and 5B are a flow chart of an example process 500 for automated generation of a model for a physical device. In some implementations, one or more process blocks of FIGS. 5A and 5B may be performed by host device 210. In some implementations, one or more process blocks of FIGS. 5A and 5B may be performed by another device or a group of devices separate from or including host device 210, such as physical device 230 and/or server device 240.

As shown in FIG. 5A, process 500 may include establishing a connection with a physical device (block 505). For example, host device 210 may establish the connection with physical device 230. In some implementations, host device 210 may establish the connection with physical device 230 based on physical device 230 being moved within communication range of host device 210. For example, host device 210 may detect that physical device 230 is capable of connecting to host device 210 (e.g., detect that physical device 230 includes a communication interface for a connection to host device 210 based on information being transmitted by physical device 230), and may establish the connection based on detecting that physical device 230 is capable of connecting. Additionally, or alternatively, host device 210 may establish the connection with physical device 230 based on a user indication. For example, when host device 210 provides a user interface to a particular user, the particular user may indicate to host device 210 (e.g., based on interacting with the user interface) that host device 210 is to connect to physical device 230.

As further shown in FIG. 5A, process 500 may include identifying the physical device (block 510). For example, host device 210 may identify physical device 230. In some implementations, host device 210 may lack a priori information regarding physical device 230 when identifying physical device 230. For example, host device 210 may establish the connection with an unknown physical device 230 (e.g., an unknown camera, an unknown sensor, an unknown actuator, an unknown robot, an unknown smartphone, etc.). In this case, host device 210 may request a physical device information pointer. A physical device information pointer may refer to information provided by physical device 230 identifying a location from which host device 210 may access physical device information. For example, host device 210 may request and receive, from physical device 230, a particular physical device information pointer that includes a physical device identifier (e.g., a serial number, an address, a device name, etc.), a network address associated with providing physical device information, or the like. In some implementations, the physical device identifier may be a service identifier associated with a provider of a functionality (e.g., that may be described by service information in a particular descriptive language such as web service description language, or the like).

As further shown in FIG. 5A, process 500 may include determining physical device information associated with the physical device based on identifying the physical device (block 515). For example, host device 210 may determine physical device information, associated with physical device 230. In some implementations, host device 210 may utilize the physical device information pointer (e.g., host device 210 may access an indicated web address, search the Internet using a provided device identifier, or the like) to determine the physical device information. For example, host device 210 may receive, from a data structure identified by the physical device information pointer, physical device information in a particular format (e.g., an XML document, a unified modeling language (UML) document, a Joint Photographic Experts Group (JPEG) file, a Moving Picture Expert Group v. 4 (MPEG-4) file, a HyperText Markup Language (HTML) document, a dynamically typed, array based, functional language document, such as a MATLAB document, or the like, an IP-XACT IEEE 1685 file, a ISO 10303 standard for the exchange of product model data (STEP) file, or the like).

In some implementations, host device 210 may utilize one or more format adaptors, translators, or the like, to process the physical device information. For example, host device 210 may receive physical device information associated with a first information format and interpretation information associated with altering the physical device information into a second information format that may be utilized to generate a model element and/or interpreting the first information format. In this case, host device 210 may adapt the physical device information associated with the first information format to other physical device information associated with the second information format. In some implementations, host device 210 may adapt the physical device information to generate one or more descriptions associated with physical device 230, such as a behavior description, an I/O interface description, a toolchain description, or the like, that identify attributes of physical device 230 relating to simulating physical device 230, connecting to physical device 230, re-configuring physical device 230, or the like.

In some implementations, host device 210 may determine physical device information that includes descriptive information identifying a physical device driver (e.g., a computer program or code), a hardware element associated with physical device 230, a functionality associated with physical device 230, a toolchain (e.g., program code associated with compiling generated code and downloading an executable and/or a bitstream to physical device 230), an input/output interface (e.g., program code associated with communications between a processor associated with TCE 220 and physical device 230), a communication interface, a scheduler, a set of existing portions of program code (e.g., program code being utilized by physical device 230), and/or any other information that would allow host device 210 to generate a model element for physical device 230.

Additionally, or alternatively, host device 210 may determine physical device information associated with a set of application programming interfaces for physical device 230, a set of module descriptions for elements of hardware associated with physical device 230, a set of graphical representations of physical device 230, or the like.

In some implementations, host device 210 may determine physical device information that includes information regarding modifying the behavior of physical device 230, connecting to physical device 230, controlling physical device 230, simulating physical device 230, or the like. In some implementations, host device 210 may receive some physical device information from physical device 230 and may incorporate the physical device information from physical device 230 into other physical device information determined based on the physical device information pointer. In some implementations, host device 210 may generate some physical device information based on information received from physical device 230, such as a physical device information pointer, or the like. In some implementations, host device 210 may receive a set of physical device information pointers, and may receive physical device information from a set of network addresses indicated by the set of physical device information pointers.

In some implementations, host device 210 may parse the physical device information to determine the physical device information. For example, host device 210 may receive an XML file including physical device information, and may parse the physical device information to determine one or more aspects of physical device 230, such as a behavior that may be simulated via TCE 220, an I/O interface for communication with physical device 230 during simulation, a scheduler and/or a toolchain for re-configuring physical device 230, or the like. In some implementations, host device 210 may iteratively determine physical device information. For example, host device 210 may determine, based on parsing physical device information received from a particular data structure, that the physical device information includes insufficient information to model physical device 230. In this case, host device 210 may access other physical device information from another data structure, such as by searching the Internet and/or another network (e.g., an Internet of Things network, a private network, or another network) to locate the other data structure storing other physical device information, and may parse the other physical device information to determine whether there is sufficient physical device information to model physical device 230. In some implementations, host device 210 may attempt to locate physical device information until host device 210 determines that located physical device information includes sufficient information to model physical device 230.

In some implementations, host device 210 may monitor a location associated with the physical device information for updated physical device information. For example, host device 210 may determine that physical device information has been altered and may utilize the altered physical device information to generate the model element, to alter the model element, or the like.

As further shown in FIG. 5A, process 500 may include determining whether a model element for the physical device is stored via a repository (block 520). For example, host device 210 may determine whether a model element and/or an aspect thereof for physical device 230 is stored via a particular repository, such a hardware repository, a feature repository, a toolchain repository, or the like. In some implementations, host device 210 may determine that a particular aspect of a model element for physical device 230 may be stored via a repository. For example, host device 210 may determine that a model element corresponding to a particular I/O interface module (e.g., a motor, a sensor, etc.) is included in a repository storing model elements associated with I/O interface modules. In this case, host device 210 may incorporate the model element into a model of physical device 230, and may generate one or more other model elements corresponding to one or more other aspects of physical device 230.

As further shown in FIG. 5A, if the model element for the physical device is stored in a repository (block 520—YES), then process 500 may include selecting the model element from the repository (block 525). For example, host device 210 may select the model element from a particular repository, and may incorporate the model element into a model for physical device 230, into another model element for physical device 230, or the like. In some implementations, host device 210 may select the model element from a set of model elements generated by host device 210. For example, when host device 210 generates a model element for a first physical device 230, as described with regard to FIG. 5B, and host device 210 may store the model element for usage with a second physical device 230. Additionally, or alternatively, host device 210 may select the model element from a set of model elements generated by a set of users of a set of host devices 210, a set of vendors of a set of physical devices 230, or the like. In this way, host device 210 may utilize an existing model element when generating a model for physical device 230, a model element for physical device 230, or the like.

As further shown in FIG. 5A, and as shown in FIG. 5B, if the model element for the physical device is not stored in a repository (block 520—NO), then process 500 may include generating the model element corresponding to the physical device (blocks 530-536). For example, host device 210 may generate the model element associated with representing physical device 230 via TCE 220.

In some implementations, when host device 210 generates the model element, host device 210 may provide a notification to one or more other host devices 210, one or more server devices 240, or the like indicating that the model element is available for use.

Figure 6A:
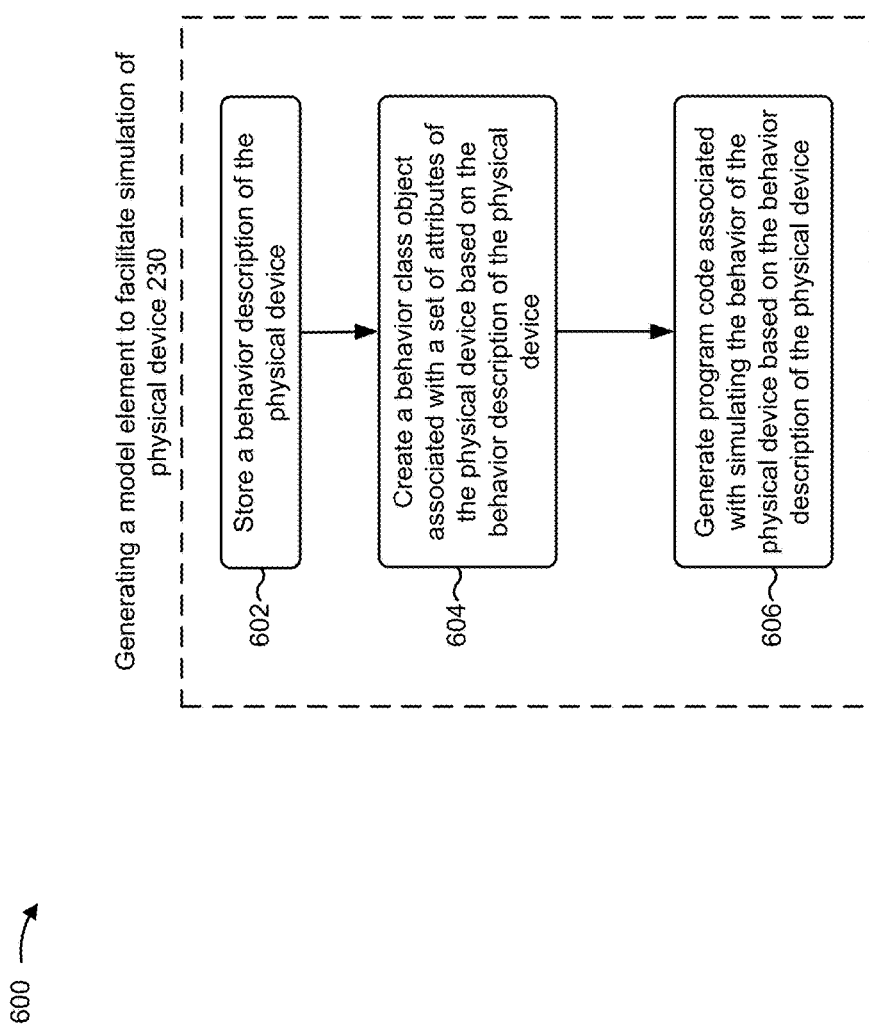
FIGS. 6A-6C are example flow charts corresponding to blocks of the flow chart of FIGS. 5A and 5B.

In some implementations, host device 210 may integrate simulation of a behavior of physical device 230 into the model element when generating a model element, as described with regard to FIG. 6A. Additionally, or alternatively, host device 210 may integrate an I/O interface of physical device 230 into the model element, when generating the model element, to connect to physical device 230 during simulation to control physical device 230, to receive and/or provide information to physical device 230, or the like, as described with regard to FIG. 6B. Additionally, or alternatively, host device 210 may integrate a toolchain and/or a scheduler into the model element when generating the model element to facilitate performing code generation for physical device 230 to modify a functionality of physical device 230, as described with regard to FIG. 6C.

As further shown in FIG. 5B, generating a model element may include storing a description of physical device 230 (block 532). For example, host device 210 may store a description of physical device 230 via a repository. In some implementations, block 532 may correspond to block 602 of FIG. 6A, block 612 of FIG. 6B, and/or block 622 of FIG. 6C. For example, host device 210 may store a description (e.g., an XML description) of physical device 230 determined based on the physical device information for physical device 230. In some implementations, the description may include a behavior description associated with simulation of physical device 230, an I/O interface description associated with connection to physical device 230 during simulation, a toolchain description and/or a scheduler description associated with generating program code to re-configure physical device 230, or the like, as described herein with respect to FIGS. 6A-6C.

In some implementations, host device 210 may generate a set of properties associated with the model element based on the description of the physical device. For example, host device 210 may determine a set of quality of service (QOS) properties based on a set of properties associated with physical device 230, such as a latency budget, a rate transition, a resource availability, a reliability, historical data associated therewith, a communication type, or the like.

As further shown in FIG. 5B, process 500 may include creating a class object associated with a set of attributes of the physical device based on the description of the physical device (block 534). For example, host device 210 may create the class object associated with the set of attributes of physical device 230. In some implementations, block 534 may correspond to block 604 of FIG. 6A, block 614 of FIG. 6B, and/or block 606 of FIG. 6C. In some implementations, host device 210 may generate a behavior class object, an I/O interface class object, a toolchain class object, a scheduler class object, or the like, as described herein with respect to FIGS. 6A-6C. In some implementations, a class object may be associated with generated program code that may be executed to perform a simulation, communication with physical device 230, or generate other program code for physical device 230.

Although implementations, described herein, reference class objects, implementations, described herein, may also utilize another representation for physical device 230 that does not utilize class objects and/or an object-oriented programming scheme.

As further shown in FIG. 5B, process 500 may include generating program code associated with the physical device based on the description of the physical device (block 536). For example, host device 210 may generate program code associated with physical device 230. In some implementations, block 536 may correspond to block 606 of FIG. 6A, block 616 of FIG. 6B, and/or block 626 of FIG. 6C. For example, host device 210 may generate program code associated with simulating a behavior of physical device 230. Additionally, or alternatively, host device 210 may generate program code associated with communicating with physical device 230 to control a functionality and/or a behavior of physical device 230. Additionally, or alternatively, host device 210 may generate program code associated with facilitating alteration of a functionality of physical device 230.

Host device 210 may generate particular program code associated with a particular aspect of physical device 230 when generating the model element, in some implementations. For example, host device 210 may generate program code associated with a hardware element behavior, a toolchain, a scheduler, or another aspect of physical device 230, such as an input/output (I/O) interface module block (e.g., a representation of an I/O interface module associated with physical device 230, such as a time-based graphical model block, etc.), a Processor-in-the-Loop (PIL) functionality (e.g., a simulation functionality for generated program code), a hardware in the loop (HIL) functionality, a software in the loop (SIL) functionality, an external mode functionality (e.g., that includes parameter tuning and/or signal monitoring for physical device 230), a profiler functionality (a functionality associated with managing resource usage during simulation), a system safety assurance functionality (e.g., a functionality associated with reducing a risk of hazard associated with operation of physical device 230 and/or simulation thereof), a marshalling functionality (e.g., a functionality associated with serializing information associated with model element), or the like.

In some implementations, the program code may conform to an execution framework for the model (e.g., the program code may include an initialize function, an output function, an update function, or the like). For example, host device 210 may generate information stored via a particular data structure that may be read by a processor performing interpretive simulation to simulate behaviors of physical device 230. Additionally, or alternatively, host device 210 may generate aspects of the model element and/or program code associated therewith associated with utilizing the model element in a modeling environment. For example, host device 210 may generate a set of sample time attributes, a set of ports, a set of port dimensions, or the like. In some implementations, host device 210 may generate a block representation of the model element when generating the model element. For example, host device 210 may generate a graphical representation of the model element that may include a set of inputs, a set of outputs, a set of connectors, or the like, describing physical device 230.

As further shown in FIG. 5A, process 500 may include providing information associated with the model element (block 540). For example, host device 210 may provide information associated with the model element corresponding to physical device 230 for utilization by a user of TCE 220, such as for simulation, modification, inclusion in a model, or the like. In some implementations, host device 210 may provide generated program code for review, execution, testing, or the like. Additionally, or alternatively, host device 210 may provide simulation results from one or more simulations performed utilizing the model and the generated program code for physical device 230.

Host device 210 may pair the model element to physical device 230 when providing information associated with the model element, in some implementations. For example, host device 210 may associate the model element to physical device 230 to facilitate informational exchange between a processor operating the model element and physical device 230. In this way, the model element may be utilized to analyze, execute, simulate, modify, etc. physical device 230.

In some implementations, host device 210 may add the model element for physical device 230 to a device network, when providing information associated with the model element. For example, host device 210 may add the model element to a network of model elements, and may receive information from the network of model elements that may be processed and provided to physical device 230 to modify a behavior of physical device 230. Additionally, or alternatively, host device 210 may remove the model element for physical device 230 from a device network based on losing connectivity with physical device 230. In this way, host device 210 may monitor and simulate a network of model elements, and may control behavior associated with the network of model elements. In some implementations, physical device 230 may add physical device 230 and/or another physical device 230 to an ad hoc device network. In some implementations, host device 210 may provide information associated with the device network. For example, host device 210 may select a first set of model elements from a repository and a second set of model elements generated by host device 210 for a device network, and may provide information identifying the device network.

In some implementations, host device 210 may provide information associated with controlling physical device 230. For example, host device 210 may associate program code of the model element with a control interface associated with physical device 230, and may utilize one or more portions of the program code to control physical device 230 via the control interface. Additionally, or alternatively, host device 210 may simulate a set of physical devices 230 of a network of devices that includes physical device 230, may determine operational data based on simulating the set of physical devices, and may provide the operational data to physical device 230 to control a behavior of physical device 230 (e.g., to control functionality of a hardware element of physical device 230). As an example, host device 210 may receive operational data regarding road conditions from a set of driverless car physical devices 230 associated with a device network of model elements 230, may process the operational data to determine a set of instructions associated with safe driving on the road conditions for a particular driverless car physical device 230 of the set of driverless car physical devices 230, and may provide the set of instructions to the particular driverless car physical device 230 to control a behavior of the particular driverless car physical device 230. In this way, host device 210 may utilize the model to control physical device 230.

In some implementations, host device 210 may provide information associated with reconfiguring physical device 230. For example, host device 210 may generate program code, modify stored program code, or the like, to change a behavior of physical device 230. For a first example, assume that physical device 230 is a scanner that includes the ability to scan an image, host device 210 may generate a model element including program code associated with a facial recognition functionality, and may provide the program code to the scanner to perform the facial recognition functionality. For a second example, assume that physical device 230 is a motor that does not include a speed controller. Host device 210 may generate a model element including program code associated with a controller (e.g., a proportional-integral-differential (PID) controller, a proportional controller, or the like), and may provide the program code to the motor to allow the motor to control the speed output using the controller, as shown in FIG. 4F. In this way, host device 210 may utilize the model to modify physical device 230. In some implementations, a first physical device 230 may provide information associated with reconfiguring a second physical device 230. In this case, a first model element representing first physical device 230 may include a second model element representing second physical device 230.

In some implementations, host device 210 may update a user interface (e.g., associated with TCE 220) to include information identifying the hardware element (e.g., for selection when generating another model element associated with another physical device 230, for simulation via TCE 220, or the like). In some implementations, providing information identifying the hardware element may include populating a library of hardware elements, such as an I/O block library, or the like.

In some implementations, host device 210 may provide information to modify physical device information associated with physical device 230. For example, when providing program code to physical device 230 to alter a functionality of physical device 230, host device 210 may access a source of physical device information for physical device 230 to update the physical device information to include the altered functionality.

Although FIGS. 5A and 5B shows example blocks of process 500, in some implementations, process 500 may include additional blocks, fewer blocks, different blocks, or differently arranged blocks than those depicted in FIGS. 5A and 5B. Additionally, or alternatively, two or more of the blocks of process 500 may be performed in parallel.

Figure 6B:
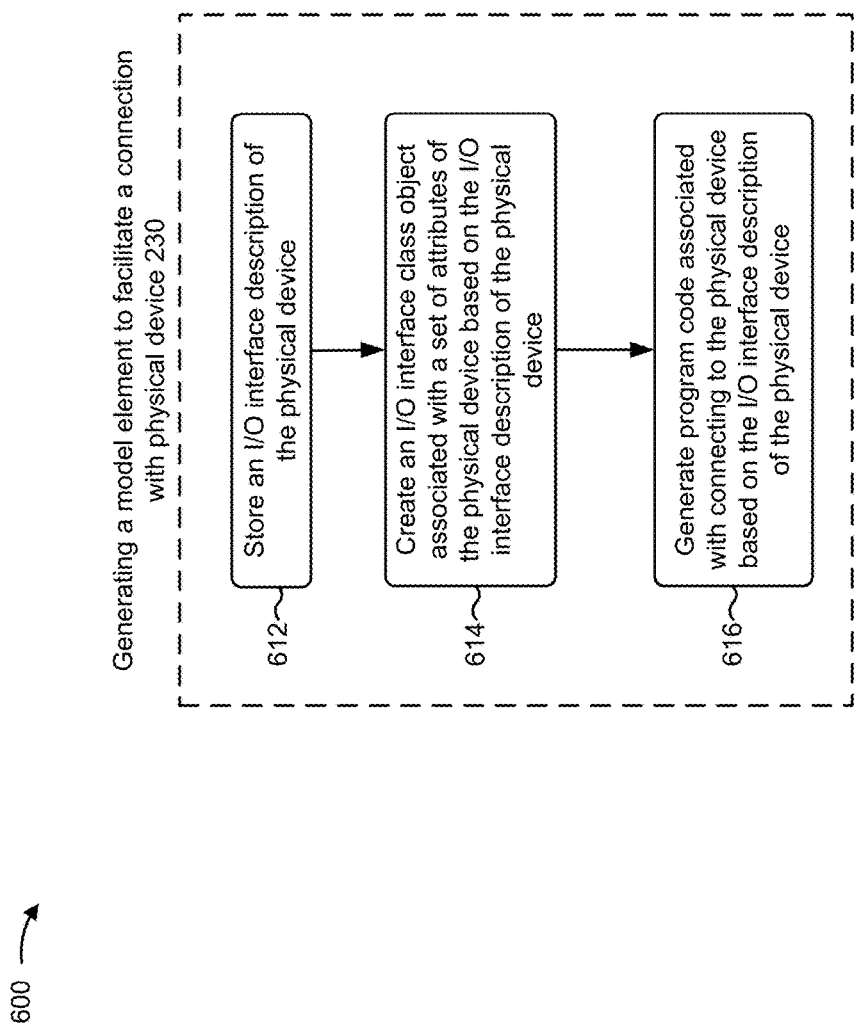
Figure 6C:
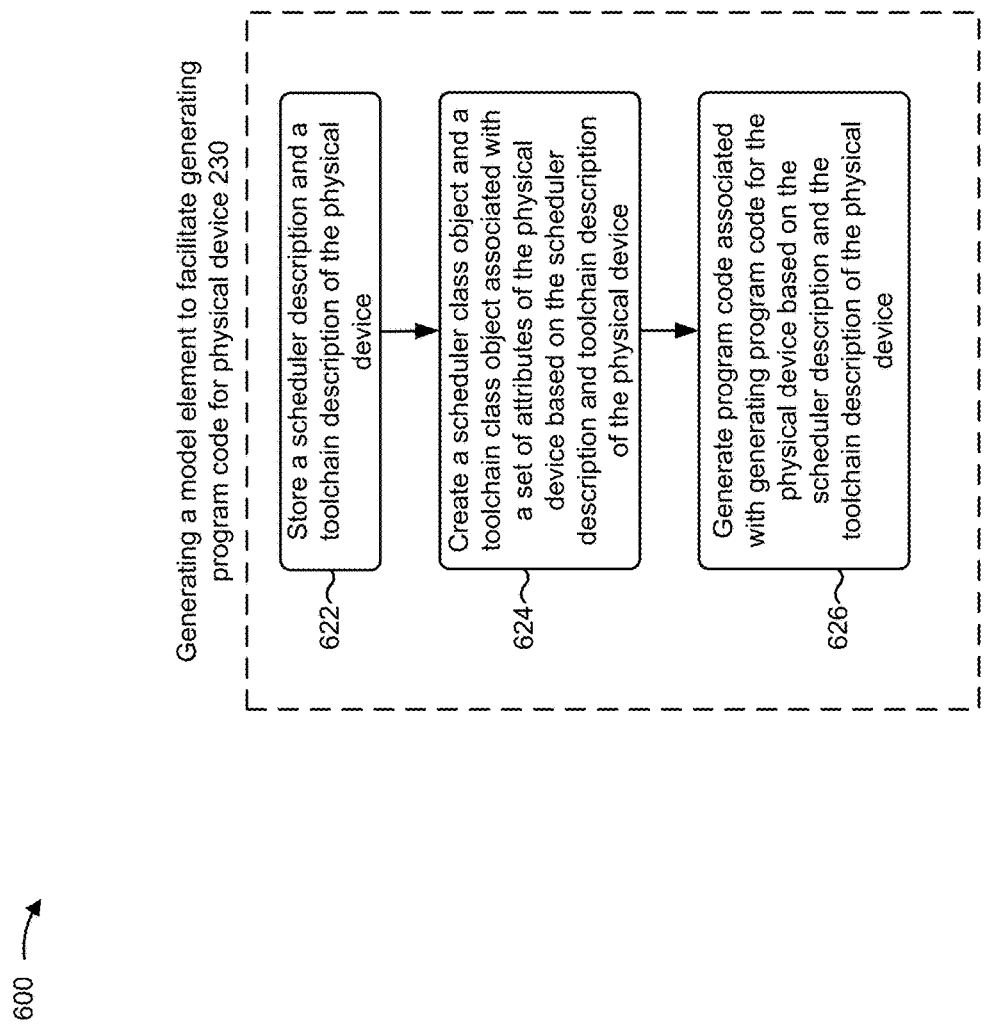

FIGS. 6A-6C are flow charts of an example process 600 corresponding to blocks of example process 500 shown in FIGS. 5A and 5B. In some implementations, one or more process blocks of FIGS. 6A-6C may be performed by host device 210. In some implementations, one or more process blocks of FIGS. 6A-6C may be performed by another device or a group of devices separate from or including host device 210, such as physical device 230 and/or server device 240.

As shown in FIG. 6A, process 600 may relate to generating a model element to facilitate simulation of physical device 230.

As further shown in FIG. 6A, generating a model element to facilitate simulation of physical device 230 may include storing a behavior description of the physical device (block 602). For example, host device 210 may store the behavior description of physical device 230. In some implementations, block 602 may correspond to block 532 of FIG. 5B. In some implementations, host device 210 may store the behavior description for utilization with physical device 230 when simulating physical device 230, for utilization with another physical device 230 when generating another model element corresponding to the other physical device 230, or the like.

In some implementations, the behavior description, determined based on the physical device information, may relate to simulating a behavior of a functionality of physical device 230. In some implementations, physical device 230 may store a description of another hardware element of physical device 230, such as a description of a set of sensors, a set of actuators, a set of motors, or the like, associated with physical device 230. For example, as shown in FIG. 4D, a description of a robot may include a description of a motor, an ultrasonic sensor, and an encoder. In this case, the behavior description may include a set of attributes, such as, for the motor, a speed attribute, a frequency attribute, a control scheme attribute, or the like.

As further shown in FIG. 6A, generating a model element to facilitate simulation of physical device 230 may include creating a behavior class object associated with a set of attributes of the physical device based on the behavior description of the physical device (block 604). For example, host device 210 may create the behavior class object associated with the set of attributes of physical device 230. In some implementations, block 604 may correspond to block 534 of FIG. 5B. For example, host device 210 may process the behavior description, the physical device information, and/or other information relating to physical device 230 to generate a class object associated with a behavior of physical device 230. In this example, host device 210 may generate a behavior class object relating to a motor of physical device 230, a sensor of physical device 230, or the like. In some implementations, the behavior class object may include information associated with visualizing simulation results. Additionally, or alternatively, the behavior class object may include information associated with causing a simulation step to be performed. In some implementations, the behavior class object may include information incorporating the set of attributes, such as information incorporating a speed attribute of a motor, a control scheme attribute of a motor, or the like.

As further shown in FIG. 6A, generating a model element to facilitate simulation of physical device 230 may include generating program code associated with simulating the behavior of the physical device based on the behavior description of the physical device (block 606). For example, host device 210 may generate program code associated with simulating the behavior of physical device 230. In some implementations, block 606 may correspond to block 536 of FIG. 5B. In some implementations, the program code may include program code associated with determining a behavior of a functionality of physical device 230, when simulating physical device 230. For example, host device 210 may generate program code that, when executed, causes information to be generated that simulates a behavior of physical device 230, such as an operation of a motor, an operation of a scanner, or the like. In some implementations, host device 210 may generate a set of run-time software artifacts (e.g., particular program code) associated with performing simulation of physical device 230.

As shown in FIG. 6B, process 600 may relate to generating a model element to facilitate a connection with physical device 230.

As shown in FIG. 6B, generating a model element to facilitate a connection with physical device 230 may include storing an input/output (I/O) interface description of the physical device (block 612). For example, host device 210 store the I/O interface description of physical device 230. In some implementations, block 612 may correspond to block 532 of FIG. 5B. In some implementations, the I/O interface description may relate to connecting to physical device 230 during simulation. For example, the I/O interface description identify program code functions of physical device 230 that may be accessed during simulation to control physical device 230, to receive information from physical device 230, to provide information to physical device 230, or the like. In some implementations, the description may include attributes associated with a particular I/O interface of physical device 230 (e.g., attributes associated with an Ethernet interface, a wireless interface, or the like).

As further shown in FIG. 6B, generating a model element to facilitate a connection with physical device 230 may include creating an I/O interface class object associated with a set of attributes of the physical device based on the I/O interface description of the physical device (block 614). For example, host device 210 may create the I/O interface class object associated with the set of attributes of physical device 230. In some implementations, block 614 may correspond to block 534 of FIG. 5B.

In some implementations, host device 210 may generate an I/O interface class object that is associated with utilizing the I/O interface to communicate with physical device 230 during simulation. For example, host device 210 may generate an I/O interface class object for the model element that permits the model element to control physical device 230 (e.g., to control one or more functionalities of physical device 230). Additionally, or alternatively, host device 210 may generate an I/O interface class object that permits the model element to receive information from physical device 230 during simulation (e.g., operational date), to provide information to physical device 230 during simulation (e.g., operational data generated by the model element, generated by another physical device 230, etc.), or the like.

As further shown in FIG. 6B, generating a model element to facilitate a connection with physical device 230 may include generating program code associated with connecting to the physical device based on the I/O interface description of the physical device (block 616). For example, host device 210 may generate program code associated with connecting to physical device 230 via an I/O interface of physical device 230. In some implementations, block 616 may correspond to block 536 of FIG. 5B. In some implementations, host device 210 may generate a set of run-time software artifacts (e.g., particular program code) associated with utilizing the I/O interface.

As shown in FIG. 6C, process 600 may relate to generating a model element to facilitate a generating program code for physical device 230.

As further shown in FIG. 6C, generating a model element to facilitate generating program code for physical device 230 may include storing a scheduler description and a toolchain description of the physical device (block 622). For example, host device 210 may store the scheduler description and the toolchain description associated with physical device 230. In some implementations, block 622 may correspond to block 532 of FIG. 5B.

A toolchain may refer to a software tool that is associated with translating source program code to executable information for processors, bitfiles for FPGAs, or the like. In some implementations, host device 210 may store a toolchain description that identifies a type of toolchain, such as a GCC toolchain, a Linaro toolchain, a Texas Instruments Code Composer Studio (CCS) toolchain, a Green Hills Software (GHS) MULTI toolchain, a CodeWarrior toolchain, a Xilinx Vivado toolchain, a Lauterbach toolchain, or the like, associated with software of physical device 230. Additionally, or alternatively, the toolchain description may identify another attribute of the toolchain, such as a set of toolchain functions (e.g., a compiler, an archiver, a linker, a debugger). Additionally, or alternatively, the toolchain description may identify another attribute relating to the toolchain such as a set of download utilities, a set of synthesis tools, a set of place and route tools, or the like, related to re-configuring physical device 230.

A scheduler may refer to a module associated with managing execution of program code associated with physical device 230. In some implementations, host device 210 may store a scheduler description that identifies attributes of a scheduler associated with generating code to re-configure physical device 230, such as a priority scheme attribute, a model base rate attribute, or the like.

As further shown in FIG. 6C, generating a model element to facilitate generating program code for physical device 230 may include creating a scheduler class object and a toolchain class object associated with a set of attributes of the physical device based on the scheduler description and the toolchain description of the physical device (block 624). For example, host device 210 may generate the scheduler class object and the toolchain class object associated with physical device 230. In some implementations, block 624 may correspond to block 534 of FIG. 5B.

In some implementations, a toolchain class object may include information associated with compiling software for physical device 230, interpreting software for physical device 230, debugging software for physical device 230, converting software associated with physical device 230 to another programming language that may be utilized by TCE 220 and/or a user thereof, or the like. In some implementations, a scheduler class object may include information associated with determining when particular program code is to be executed by a processor, or the like. In some implementations, the scheduler class object may include a set of software functions associated with configuring a hardware element timer to simulate at a particular model base rate (e.g., a particular sample rate), configuring an interrupt associated with interrupting execution of the model element, creating execution threads, configuring an operating system scheduling scheme, or the like. In some implementations, the scheduler class object may utilize a particular priority schedule, such as using rate monotonic scheduling, earliest deadline first scheduling, load balancing scheduling, or the like.

As further shown in FIG. 6C, generating a model element to facilitate generating program code for physical device 230 may include generating program code associated with generating program code for the physical device based on the scheduler description and the toolchain description of the physical device (block 626). For example, host device 210 may generate first program code associated with the model element that may facilitate generating second program code for physical device 230. In some implementations, block 626 may correspond to block 536 of FIG. 5B. The first program code may be program code executed by, for example, host device 210 when utilizing the model element. The second program code may be program code executed by physical device 230 during operation. Host device 210 may utilize the first program code to generate the second program code, and may provide the second program code to physical device 230, thereby altering a functionality of physical device 230 (e.g., by replacing program code of physical device 230, adding program code to physical device 230, or the like).

In some implementations, host device 210 may generate a set of run-time software artifacts (e.g., particular program code) associated with utilizing the toolchain. In some implementations, host device 210 may generate a set of run-time software artifacts (e.g., particular program code) associated with utilizing the scheduler via TCE 220.

Although FIGS. 6A-6C shows example blocks of process 600, in some implementations, process 600 may include additional blocks, fewer blocks, different blocks, or differently arranged blocks than those depicted in FIGS. 6A-6C. Additionally, or alternatively, two or more of the blocks of process 600 may be performed in parallel.

In this way, host device 210 may generate a model for physical device 230 without a priori knowledge of physical device 230 and without physical device 230 providing physical device information, such as drivers, software interfaces, or the like, thereby streamlining model creation and simulation.

The foregoing disclosure provides illustration and description, but is not intended to be exhaustive or to limit the implementations to the precise form disclosed. Modifications and variations are possible in light of the above disclosure or may be acquired from practice of the implementations.

As used herein, the term component is intended to be broadly construed as hardware, firmware, and/or a combination of hardware and software.

The term program code is to be broadly interpreted to include text-based code that may be automatically executed (e.g., C code, C++ code, Hardware Description Language (HDL) code, very-high-speed integrated circuits (VHSIC) HDL(VHDL) code, Verilog, Java, and/or other types of hardware or software based code that may be compiled and/or synthesized); binary code that may be executed (e.g., executable files that may directly be executed by an operating system, bitstream files that can be used to configure a field programmable gate array (FPGA), Java byte code, object files combined together with linker directives, source code, makefiles, etc.); text files that may be executed in conjunction with other executables. In one example, program code may include different combinations of the above-identified classes (e.g., text-based code, binary code, text files, etc.). Alternatively, or additionally, program code may be of any type, such as function, script, object, etc., and a portion of program code may include one or more characters, lines, etc. of the program code.

Certain user interfaces have been described herein and/or shown in the figures. A user interface may include a graphical user interface, a non-graphical user interface, such as a text-based user interface, or the like, etc. A user interface may provide information for display. In some implementations, a user may interact with the information, such as by providing input via an input component of a device that provides the user interface for display. In some implementations, a user interface may be configurable by a device and/or a user (e.g., a user may change the size of the user interface, information provided via the user interface, a position of information provided via the user interface, etc.). Additionally, or alternatively, a user interface may be preconfigured to a standard configuration, a specific configuration based on a type of device on which the user interface is displayed, and/or a set of configurations based on capabilities and/or specifications associated with a device on which the user interface is displayed.

It will be apparent that systems and/or methods, described herein, may be implemented in different forms of hardware, firmware, or a combination of hardware and software. The actual specialized control hardware or software code used to implement these systems and/or methods is not limiting of the implementations. Thus, the operation and behavior of the systems and/or methods were described herein without reference to specific software code—it being understood that software and hardware can be designed to implement the systems and/or methods based on the description herein.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification.

No element, act, or instruction used herein should be construed as critical or essential unless explicitly described as such. Also, as used herein, the articles "a" and "an" are intended to include one or more items, and may be used interchangeably with "one or more." Also, as used herein, the term "set" is intended to include zero or more items. Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A non-transitory computer-readable medium storing instructions, the instructions comprising:
    one or more instructions that, when executed by one or more processors, cause the one or more processors to:
        determine physical device information associated with a physical device,
            the physical device information being determined based on at least one of locating a data structure identified by a location identifier or performing a network search using information identifying the physical device,
            the data structure being physically remote to the physical device;
        generate a model element associated with the physical device based on the physical device information,
            the model element being associated with modeling a behavior of the physical device or including information enabling communication between the model element and the physical device; and
        add the model element to a model associated with the physical device;
    where the physical device information includes at least one of:
        declarative information;
        imperative information;
        dynamically typed information;
        array based information; or
        model based information.

2. The non-transitory computer-readable medium of claim 1, where the one or more instructions, when executed by the one or more processors, further cause the one or more processors to:
    transmit a request for a physical device information pointer;
    receive the physical device information pointer based on transmitting the request,
        the physical device information pointer identifying a location associated with the physical device information; and
    where the one or more instructions, that cause the one or more processors to determine the physical device information, further cause the one or more processors to:
        receive the physical device information from the data structure associated with the location identified by the physical device information pointer.

3. The non-transitory computer-readable medium of claim 1, where the one or more instructions, when executed by the one or more processors, further cause the one or more processors to:
    determine a set of functionalities associated with the physical device,
    the set of functionalities not including a particular functionality;
    generate program code associated with configuring the physical device to perform the particular functionality;
    deploy the program code to the physical device to configure the physical device to perform the particular functionality; and
    update the model element associated with the physical device to include the particular functionality.

4. The non-transitory computer-readable medium of claim 1, where the one or more instructions, when executed by the one or more processors, further cause the one or more processors to:
    receive operational data associated with a simulation from the physical device associated with a behavior of the physical device;
    process the operational data associated with the simulation using the model element associated with the physical device; and provide one or more instructions to the physical device based on processing the operational data via a connection with the physical device,
the one or more instructions describing a desired behavior of the physical device.

5. The non-transitory computer-readable medium of claim 1, where the one or more instructions, that cause the one or more processors to generate the model element associated with the physical device, further cause the one or more processors to:
generate program code associated with executing the model element,
the program code conforming to an execution framework associated with the model.

6. The non-transitory computer-readable medium of claim 1, where the model element includes at least one of:
a graphical model element; or
a textual model element.

7. The non-transitory computer-readable medium of claim 1, where the one or more processors, that execute the one or more instructions, are associated with a device that includes at least one of:
a processor;
a homogenous multi-core processor;
a heterogeneous multi-core processor;
a homogenous multi-processor;
a heterogeneous multi-processor;
a field programmable gate array; or
a graphical programming unit.

8. The non-transitory computer-readable medium of claim 1, where the one or more instructions, when executed by the one or more processors, further cause the one or more processors to:
store information associated with the model element in one or more data structures; and
utilize the stored information to generate another model element for another physical device.

9. A method, comprising:
determining physical device information based on receiving information identifying a physical device,
the physical device information being a description of one or more functionalities of the physical device, and
the determining the physical device information being performed by the device;
generating a set of one or more model elements based on the physical device information,
the set of model elements including program code associated with simulating a behavior associated with the physical device or including information enabling communication between the model elements and the physical device, and
the generating the set of model elements being performed by the device; and
associating the set of model elements with a device model corresponding to the physical device,
the associating the set of model elements being performed by the device;
where the physical device information includes at least one of:
declarative information;
imperative information;
dynamically typed information;
array based information; or
model based information.

10. The method of claim 9, where the physical device information includes at least one of:
information that identifies a hardware element of a set of hardware elements associated with the physical device;
information that identifies connection information associated with the physical device;
information that identifies software associated with the physical device;
information that identifies a toolchain associated with the physical device;
information associated with an input of the physical device; or
information associated with an output of the physical device.

11. The method of claim 9, where generating the set of model elements further comprises:
determining information associated with integrating the device model into a modeling environment; and
where the information associated with integrating the device model into a modeling environment includes at least one of:
information identifying a sample time attribute;
information identifying a set of ports; or
information identifying a set of port dimensions.

12. The method of claim 9, further comprising:
locating the physical device information using the information identifying the physical device,
the physical device information being located by searching a network.

13. The method of claim 9, further comprising:
locating the physical device information using the information identifying the physical device,
the physical device information being located locally to the device.

14. The method of claim 9, further comprising:
determining a set of functionalities associated with the physical device;
generating particular program code associated with a particular functionality,
the particular functionality not being included in the set of functionalities associated with the physical device;
incorporating the generated particular program code into the program code associated with simulating the behavior associated with the physical device; and
providing the generated particular program code to the physical device to incorporate the particular functionality into the set of functionalities associated with the physical device.

15. A device, comprising:
one or more processors to:
receive physical device information from a data structure based on the physical device identification information associated with a physical device,
the data structure being physically remote from the physical device; and
generate a model element associated with the physical device based on the physical device information,
the model element having executable semantics,
the model element including generated program code associated with the physical device, and
the model element being associated with modeling a behavior of the physical device or including information enabling communication between the model element and the physical device;

where the physical device information includes at least one of:
declarative information;
imperative information;
dynamically typed information;
array based information; or
model based information.

16. The device of claim 15, where the one or more processors are further to:
add the model element to a network of model elements associated with one or more physical devices,
the one or more physical devices including the physical device,
the network of model elements including a set of other model elements; and
determine that a particular physical device associated with another model element of the set of other model elements is out of range of the device; and
remove the other model element, of the set of other model elements, from the network of model elements.

17. The device of claim 15, where the one or more processors are further to:
perform an Internet search for the physical device information using the physical device identification information; and
where the one or more processors, when receiving the physical device information, are further to:
receive the physical device information based on performing the Internet search.

18. The device of claim 15, where the one or more processors are further to:
parse the physical device information to identify information associated with a hardware element of the physical device; and
where the one or more processors, when generating the model element, are further to:
generate the model element based on the information associated with the hardware element of the physical device,
the generated program code associated with the physical device including a class object associated with the hardware element of the physical device.

19. The device of claim 15, where the one or more processors, when receiving the physical device information, are further to:
receive particular physical device information associated with a particular information format;
receive interpretation information associated with interpreting the particular information format; and
adapt the particular physical device information into another information format based on the interpretation information,
the other information format being a format based on which a model element may be generated.

20. A non-transitory computer-readable medium storing instructions, the instructions comprising:
one or more instructions that, when executed by one or more processors, cause the one or more processors to:
determine physical device information associated with a physical device,
the physical device information being determined based on: (1) performing an Internet search using information identifying the physical device, and (2) receiving the physical device information based performing the Internet search,
the data structure being physically remote to the physical device;
generate a model element associated with the physical device based on the physical device information,
the model element being associated with modeling a behavior of the physical device or including information enabling communication between the model element and the physical device; and
add the model element to a model associated with the physical device.

21. A method, comprising:
determining physical device information based on: (1) receiving information identifying a physical device, (2) performing an Internet search for the physical device information using the information identifying the physical device, and (3) receiving the physical device information based on performing the Internet search,
the physical device information being a description of one or more functionalities of the physical device, and
the determining the physical device information being performed by the device;
generating a set of one or more model elements based on the physical device information,
the set of model elements including program code associated with simulating a behavior associated with the physical device or including information enabling communication between the model elements and the physical device, and
the generating the set of model elements being performed by the device; and
associating the set of model elements with a device model corresponding to the physical device,
the associating the set of model elements being performed by the device.

22. A device, comprising:
one or more processors to:
perform an Internet search for physical device information using physical device identification information associated with a physical device;
receive the physical device information from a data structure based on the physical device identification information, and based on performing the Internet search,
the data structure being physically remote from the physical device; and
generate a model element associated with the physical device based on the physical device information,
the model element having executable semantics,
the model element including generated program code associated with the physical device, and
the model element being associated with modeling a behavior of the physical device or including information enabling communication between the model element and the physical device.

* * * * *